(12) United States Patent
Zhao et al.

(10) Patent No.: US 10,521,445 B2
(45) Date of Patent: Dec. 31, 2019

(54) SYSTEM FOR VISUALLY EXPLORING COORDINATED RELATIONSHIPS IN DATA

(71) Applicant: Fuji Xerox Co., Ltd., Tokyo (JP)

(72) Inventors: Jian Zhao, Cupertino, CA (US); Francine Chen, Menlo Park, CA (US); Patrick Chiu, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 149 days.

(21) Appl. No.: 15/611,602

(22) Filed: Jun. 1, 2017

(65) Prior Publication Data

US 2018/0349448 A1 Dec. 6, 2018

(51) Int. Cl.
| | |
|---|---|
| *G06F 17/00* | (2019.01) |
| *G06F 16/248* | (2019.01) |
| *G06K 9/62* | (2006.01) |
| *G06F 16/28* | (2019.01) |
| *G06F 16/35* | (2019.01) |
| *G06F 16/906* | (2019.01) |
| *G06F 17/30* | (2006.01) |

(52) U.S. Cl.
CPC ......... *G06F 16/248* (2019.01); *G06F 16/287* (2019.01); *G06F 16/358* (2019.01); *G06F 16/906* (2019.01); *G06K 9/627* (2013.01); *G06F 2216/03* (2013.01)

(58) Field of Classification Search
CPC .... G06F 16/248; G06F 16/906; G06F 16/358; G06F 16/287; G06F 2216/03; G06K 9/627
See application file for complete search history.

(56) References Cited

U.S. PATENT DOCUMENTS

| | | | |
|---|---|---|---|
| 10,152,557 B2 * | 12/2018 | Banadaki | ................ G06F 16/90 |
| 2004/0249847 A1 * | 12/2004 | Wang | .................. G06F 16/2465 |
| 2006/0259475 A1 * | 11/2006 | Dehlinger | ............. G06F 16/907 |
| 2010/0050211 A1 * | 2/2010 | Seldin | ................ H04N 5/44543 725/46 |

(Continued)

OTHER PUBLICATIONS

Maoyuan Sun "Visual Analytics with Biclusters: Exploring Coordinated Relationships in Context", Sep. 6, 2016, vtechworks.lib.vt.eduhttp://hdl.handle.net/10919/72890 (Year: 2016).*

(Continued)

*Primary Examiner* — Polina G Peach
(74) *Attorney, Agent, or Firm* — Procopio, Cory, Hargreaves & Savitch LLP

(57) ABSTRACT

A method of visualizing relationship data is illustrated. The method includes receiving relationship data comprising a first type of entities, a second type of entities, and data representative of relationships between an entity of the first type and an entity of the second type, generating, based on the data representative of relationships, a bicluster connecting the entity of the first type to the entity of the second type, and generating a visualization based on the bicluster generated, wherein the visualization includes a first column representative of the first type of entities, and a second column representative of the second type of entities, wherein each row of the visualization corresponds to the generated bicluster.

16 Claims, 16 Drawing Sheets

(56) References Cited

U.S. PATENT DOCUMENTS

| | | | | |
|---|---|---|---|---|
| 2011/0246409 | A1* | 10/2011 | Mitra | G06F 17/18 |
| | | | | 706/52 |
| 2012/0221573 | A1* | 8/2012 | Wunsch, II | G06F 19/24 |
| | | | | 707/737 |
| 2014/0074829 | A1* | 3/2014 | Schmidt | G06N 7/00 |
| | | | | 707/723 |
| 2014/0114707 | A1* | 4/2014 | Rope | G06Q 10/10 |
| | | | | 705/7.11 |
| 2016/0098519 | A1* | 4/2016 | Zwir | G06F 19/24 |
| | | | | 702/19 |
| 2016/0110730 | A1* | 4/2016 | Provost | G06Q 30/0269 |
| | | | | 705/7.29 |
| 2016/0335260 | A1* | 11/2016 | Convertino | G06F 16/24578 |
| 2017/0116204 | A1* | 4/2017 | Davulcu | G06F 17/2785 |
| 2017/0185668 | A1* | 6/2017 | Convertino | G06F 17/18 |
| 2017/0235556 | A1* | 8/2017 | Edler Von Koch | G06F 8/4435 |
| | | | | 717/159 |

OTHER PUBLICATIONS

Gorg et al. "Combining Computational Analyses and Interactive Visualization for Document Exploration and Sensemaking in Jigsaw", May 8, 2012, IEEE (Year: 2013).*

Sara C. Madeira and Arlindo L. Oliveira "Biclustering Algorithms for Biological Data Analysis: A Survey", Jan.-Mar. 2004, IEEE (Year: 2004).*

Zhao et al. "Biclustering Analysis for Pattern Discovery: Current Techniques, Comparative Studies and Applications", Current Bioinformatics, 2012 (Year: 2012).*

Fiaux, P., et al., Bixplorer: Visual Analytics with Biclusters, IEEE Computer Society, Aug. 2013, pp. 90-94.

Grothaus, G. A., et al., Automatic Layout and Visualization of Biclusters, BIOKDD06: 6th Workshop on Data Mining in Bioinformatics (with SIGKDD Conference), Algorithms for Molecular Biology, 2006, 1:15, 8 pgs.

Heinrich, J., et al., BiCluster Viewer: A Visualization Tool for Analyzing Gene Expression Data, Advances in Visual Computing, ISVC 2011, Lecture Notes in Computer Science, 2011, 6938, 12 pgs.

Partl, C., et al., ConTour: Data-Driven Exploration of Multi-Relational Datasets for Drug Discovery, IEEE Trans Vis Comput Graph, Dec. 2014, 20(12), pp. 1883-1892.

Stasko, J., et al., Jigsaw: Supporting Investigative Analysis Through Interactive Visualization, Information Visualization, 2008, 7, pp. 118-132.

Sun, M., et al., A Five-Leval Design Framework for Bicluster Visualizations, IEEE Transactions on Visualizations and Computer Graphics, 20(12), Dec. 2014, pp. 1713-1722.

Sun, M., et al., BiSet: Semantic Edge Bundling with Biclusters of Sensemaking, IEEE Transactions on Visualization and Computer Graphics, 22(1), Jan. 2016, pp. 310-319.

Uno, T., et al., An Efficient Algorithm for Enumerating Closed Patterns in Transaction Databases, Discovery Science, 2004, Lecture Notes in Computer Science, 3245, 15 pgs.

* cited by examiner

Data: Two lists of biclusters $A = \{a_i\}$ and $B = \{b_j\}$.
Result: A list of matched bicluster pairs $P = \{(a_i, b_j)\}$ where $a_i \in A$ or $b_j \in B$ or nil.

$S \leftarrow \{s_{ij}\}$ where $s_{ij} = \texttt{Similarity}(a_i, b_j)$;
sort $S$ in descending order;
$A' \leftarrow \{\}, B' \leftarrow \{\}, P \leftarrow \{\}$;
foreach $s_{ij} \in S$ do
    if $s_{ij} <$ *threshold* then
        break;
    if $i \notin A'$ and $j \notin B'$ then
        add $(a_i, b_j)$ to $P$;
        add $i$ to $A'$, add $j$ to $B'$;
foreach $a_i \in A$ do
    if $i \notin A'$ then
        add $(a_i, nil)$ to $P$;
foreach $b_j \in B$ do
    if $j \notin B'$ then
        add $(nil, b_j)$ to $P$;

Algorithm 1: Bicluster matching

FIG. 13A

Data: A list of bicluster pair sets $X = \{P_i\}$ where $P_i = \{(a_k^i, b_k^i)\}$.
Result: A list of bicluster chains $Y = \{C_j\}$ where $C_j = (c_1^j, c_2^j, \ldots, c_n^j)$.
$Y \leftarrow P_1$;
for $i = 2 \ldots n$ do
 foreach $(a_k^i, b_k^i) \in P_i$ do
  if $a_k^i = nil$ then
   add $(nil_1, nil_2, \ldots, nil_i, b_k^i)$ to $Y$;
  else
   find $C_j \in Y$ where $c_i^j = a_k^i$;
   append $b_k^i$ to the end of $C_j$;
 foreach $C_j \in Y$ do
  if $\text{Length}(C_j) < i + 1$ then
   append $nil$ to the end of $C_j$;

Algorithm 2: Bicluster chaining

FIG. 13B

SYSTEM FOR VISUALLY EXPLORING COORDINATED RELATIONSHIPS IN DATA

BACKGROUND

Field

The present disclosure relates to data visualization systems, and more specifically, to systems and methods of data visualization systems to analyze coordinate relationships.

Related Art

Discovering and analyzing coordinated relationships may be an important task in many real-world applications. Coordinated relationships are groups of closely shared relations between sets of entities with different types, (e.g., the connections formed by three people all having visiting four places, either together or at different times within a certain time range). For example, in a scenario of enterprise messaging analysis, the coordinated relationships between employees and their conversations (e.g., messages within certain time windows) may indicate organic workgroups in a company. In the field of intelligent analysis, relations can be built upon co-occurrences of entities (e.g., as person and place) in documents, and the coordinated relationships can lead to evidence of collusion. In the field of bio-informatics, scientists may explore coordinated relationships from gene expression and interaction datasets to discover sets of genes/proteins that are commonly expressed or regulated conditions and species.

Several related art computational methods may offer some initial insights about coordinated relationships, but can be difficult to understand due to the complexity of the algorithmic output. In such related art systems, the analysis of coordinated relationships may be based on applying the data mining technique of biclustering. Additionally, once the biclustering has been applied a related art representation may be generated. FIGS. 1A and 1B illustrate related art representations of bicluster relationships of entities. FIG. 1A shows a matrix-based representation of employees (A1-A7 illustrated along the vertical axis 105) and conversations (e.g., email, instant messenger, etc.) between employees (B1-B5 illustrated along the horizontal axis 110). FIG. 1B shows a list-based representation of employees (A1-A7 illustrated along Column 115) and conversations (e.g., email, instant messenger, etc.) between employees (B1-B5 illustrated along Column 120). FIGS. 1A and 1B are discussed in greater detail below.

The related art biclustering algorithms may output maximal biclusters (which satisfy of a minimum size requirement) that are discovered from relationships between two sets of entities. For example, in FIG. 1A a bicluster 125, (made up of employees {A4, A5} and conversations {B3, B4, B5}) can be detected by the biclustering algorithm. Bicluster 125 indicates that two employees ({A4, A5}) participated in all three conversations ({B3, B4, B5}). Therefore, the bicluster 125 may represent a potential workgroup, and is maximal because no employee-conversation relation can be added to the bicluster to increase its size.

While related art biclustering algorithms may help analysts discover coordinated relationships, the output can be complicated and too large for exploration in non-graphical form to be practical. Moreover, many real world applications may require more than one pair of entity types to be explored by creating bicluster chains (e.g., a first set of biclusters connecting employee and conversation and a second set of biclusters connecting conversations and topics). Related art visualization techniques can help understand coordinated relationships from the detected biclusters. The two main related art approaches of visualizing relational data are matrix-based (illustrated in FIG. 1A) and list-based representations (illustrated in FIG. 1B). However, both of these have significant drawbacks. The matrix-based representation of FIG. 1A cannot intuitively reveal all biclusters (e.g., bicluster 130{A1, A4, A5}×{B3, B5} is less easily recognized). Further, the list-based representation of FIG. 1B becomes visually cluttered when the number of entities is increased (e.g., employees (A1-A7 illustrated along Column 115) and employees (B1-B5 illustrated along Column 120)).

Although several advanced related art visualization techniques have been proposed based on the two basic approaches illustrated in FIGS. 1A and 1B, the scalability of displaying a larger number of biclusters or entities is still an issue due to the computational resource requirements of the related art visualization techniques. Further, related art visualization techniques have overlooked the effect weighting can have on visualizing biclusters.

SUMMARY OF THE DISCLOSURE

Aspects of the present disclosure may include a method of visualizing relationship data. The method may include receiving relationship data comprising a first type of entities, a second type of entities, and data representative of relationships between an entity of the first type and an entity of the second type, generating, based on the data representative of relationships, a bicluster connecting the entity of the first type to the entity of the second type, and generating a visualization based on the bicluster generated, wherein the visualization includes a first column representative of the first type of entities, and a second column representative of the second type of entities, wherein each row of the visualization corresponds to the generated bicluster.

Additional aspects of the present disclosure may include a non-transitory computer readable medium having stored therein a program for making a computer execute a method of visualizing relationship data. The method may include receiving relationship data comprising a first type of entities, a second type of entities, and data representative of relationships between an entity of the first type and an entity of the second type, generating, based on the data representative of relationships, a bicluster connecting the entity of the first type to the entity of the second type, and generating a visualization based on the bicluster generated, wherein the visualization includes a first column representative of the first type of entities, and a second column representative of the second type of entities, wherein each row of the visualization corresponds to the generated bicluster.

Additional aspects of the present disclosure may also include a computer apparatus configured to visualize relationship data. The computer apparatus may include a memory storing relationship data comprising a first type of entities, a second type of entities, and data representative of relationships between an entity of the first type and an entity of the second type, a processor and a display device. The processor may execute a process including generating, based on the data representative of relationships, a bicluster connecting the entity of the first type to the entity of the second type, and generating a visualization based on the bicluster generated, wherein the visualization includes a first column representative of the first type of entities, and a second column representative of the second type of entities, wherein each row of the visualization corresponds to the generated bicluster. The display device may be configured to display the generated visualization.

Additional aspects of the present disclosure may also include a computer apparatus configured to visualize relationship data. The computer apparatus may include means for storing relationship data comprising a first type of entities, a second type of entities, and data representative of relationships between an entity of the first type and an entity of the second type, means for generating, based on the data representative of relationships, a bicluster connecting the entity of the first type to the entity of the second type, means for generating a visualization based on the bicluster generated, wherein the visualization includes a first column representative of the first type of entities, and a second column representative of the second type of entities, wherein each row of the visualization corresponds to the generated bicluster, and means for displaying the generated visualization.

BRIEF DESCRIPTION OF THE DRAWINGS

FIGS. 13A and 13B illustrate example algorithms used in some example implementations of the present application.

DETAILED DESCRIPTION

Figure 1:
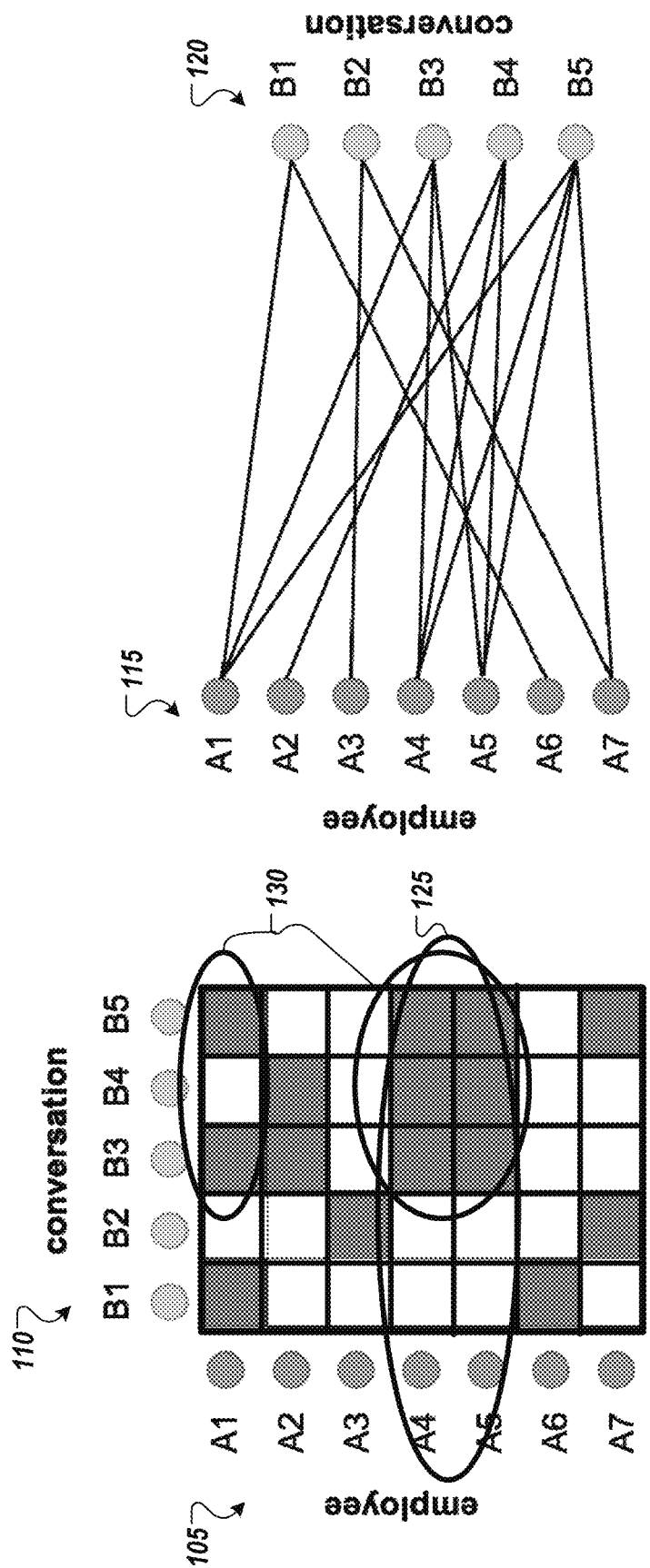
FIGS. 1A and 1B illustrate related art representations of bicluster relationships of entities.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Example implementations may relate to a visualization system that allows analysts to interactively explore coordinated relationships based on biclusters generated using a bicluster algorithm. From relationships between two domains (entity types; e.g., gene and condition, or organization and person), the goal of biclustering is to identify corresponding subsets of entities from each domain with the restriction that entities in each subset share similar attributes (e.g., genes behaving identically for gene-condition relationships in bio-informatics). Compared to clustering, biclustering generalizes the idea of simultaneously finding coherent subsets from two domains. This is also the reason that biclusters may serve as the basis of analyzing coordinated relationships that are more general (e.g., insights discovered from a number of related biclusters or parts of a bicluster).

In example implementations, the system may encode biclusters in a more compact and bicluster-centric manner to allow scalable visualization of large numbers of entities. Additionally, in some example implementations, the system may also provide dynamic analytical tools to enable flexible and dynamic analysis of a larger number of biclusters. Further, in some example implementations, the visualization system may also weighting tool to the datasets to generated weighted relationships in the biclustering. In many real-world applications, relationships are often associated with different levels of strength. For example, connections between employees and conversations can include the information of how much each employee participates in a conversation, and links between documents and topics can represent topic probabilities. Incorporating this information can provide analytical insight and identify relationships that might not be readily apparent.

One aspect of example implementations is a visualization that can show the biclustering output in a bicluster-centric manner, where biclusters are displayed as visual objects that an analyst can manipulate. This is different from most of the existing approaches (see FIGS. 1A and 1B) that are entity-centric, which fails to reveal all biclusters or their relations (due to entity overlap of biclusters). The key aspects of the visualization system are described in detail herein. Consider the input to be the result of a biclustering algorithm on weighted relational data, where each bicluster in the result consists of two sets of entities and their relationships (with weight values).

Figure 2:
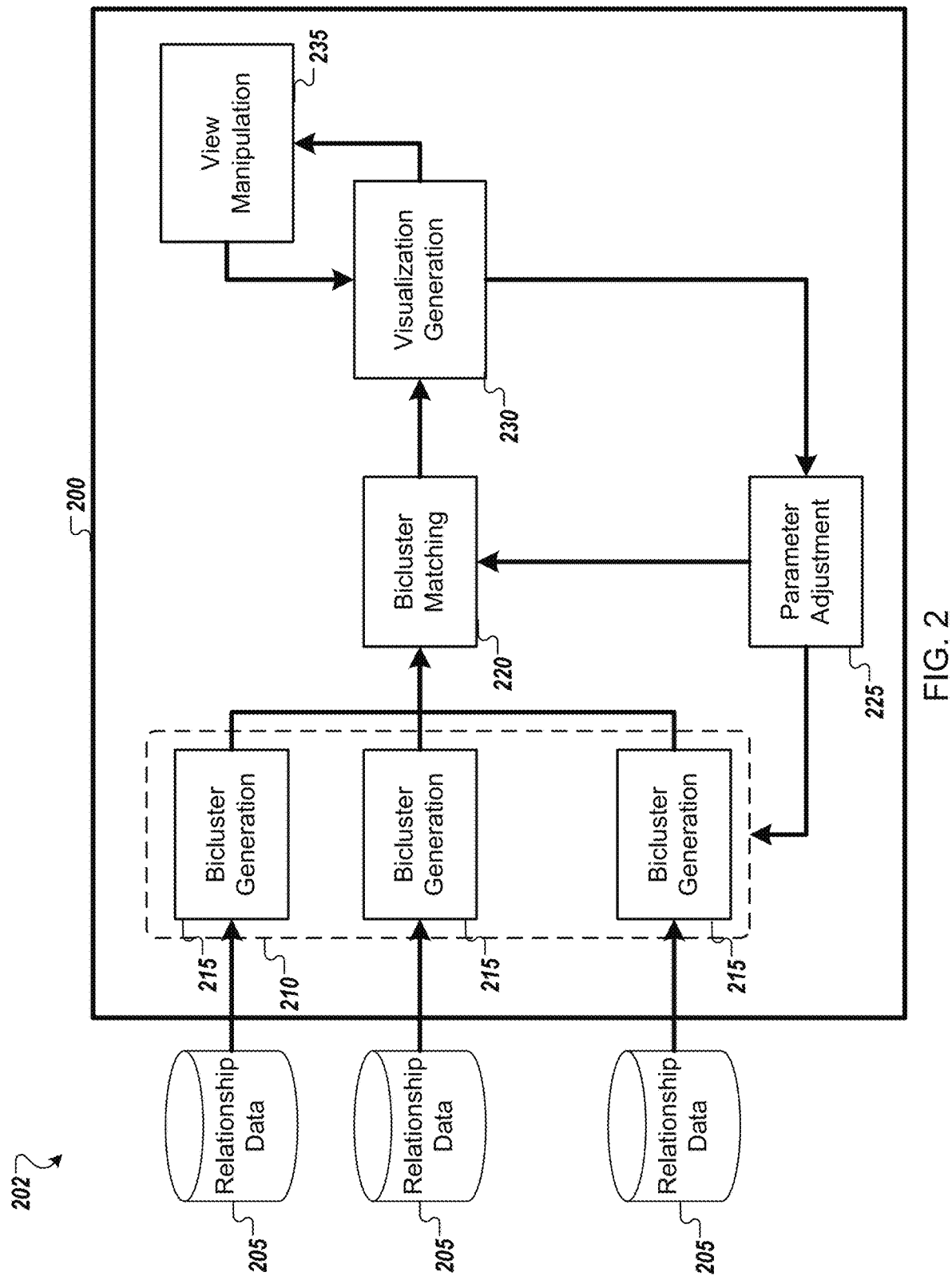
FIG. 2 illustrates a process diagram of a visualization process according to example implementations of the present application.

FIG. 2 illustrates a process diagram of a visualization process 202 performed by a visualization system 200 according to an example implementation of the present application. As illustrated, in the process 202 the system 200 receives relationship data 205 from one or more databases. The type of database is not particularly limited and may include any type of data records including email data, travel data, phone call data, instant message data, event data, or any other type of data that might be apparent to a person of ordinary skill in the art. Further, the relationship data 205 is not particularly limited and may represent any relationships between entities or domains of aspects associated with data records of the database. For example, the relationship data 205 may represent relationships between any combination of author information, content information, time information, date information, location information, or any other information that might be apparent to a person of ordinary skill in the art. For each set of relationship data 205 storing relationships between two different types of entities, biclusters are generated at 215 using biclustering algorithm applied individually by a biclustering engine 210 based on a user-specified set of parameters. The biclustering outputs are fed into a bicluster matching module to perform bicluster matching at 220 that identifies biclusters with matching entities to identify and discover bicluster chains. A process 900 of generating bicluster chains is discussed in greater detail below with respect to FIG. 9.

After the bicluster matching 220, the output is then input into a frontend visualization generator to generate a visualization at 230. With the visualization, an analyst can discover insights in the data by interactively manipulating the visual representations using a view manipulation engine at 235. Various aspects of view manipulation are discussed in greater detail below. Further, the analyst can dynamically adjust the biclustering process in the backend at 225 by configuring the set of parameters using a parameter adjustment engine.

Each of these sub-processes is discussed in greater detail below with reference to example implementations of visualizations. The components are discussed below in the following order. First, the visualization generation 230 by converting the abstract data (biclusters or bicluster chains) into concrete visuals will be discussed. The view manipulations provided by the view manipulation engine at 235 to dynamically change the appearance of the visualization will be discussed. Next, the bicluster matching at 220 to prepare the input for the visualization from the output of biclustering generation processes at 215 of the biclustering engine 210 will be discussed. Finally, an interface of the parameter adjustment at 225 to adjust parameters for the biclustering algorithms to modify the input for the visualization will be discussed.

One aspect of the visualizations generated is to show the biclustering output in a bicluster-centric manner in which biclusters are displayed as visual objects that an analyst can manipulate. This is different from the related existing approaches (illustrated in FIGS. 1A and 1B) that are entity-centric (e.g., focused on displaying entities and merely displaying biclusters indirectly), which fails to reveal all biclusters or their relations (due to entity overlap of biclusters). In describing aspects of the visualization system in detail, exemplary input data is used. Exemplary input data may be the result of one or more bicluster generation operations at 215, where each bicluster in the result consists of two sets of entities and their relationships. In some example implementations, one or more bicluster generation operations at 215 may be performed using weighted relational data with each bicluster in the result consisting of two sets of entities and their relationships (with associated weight values).

Figure 3A:
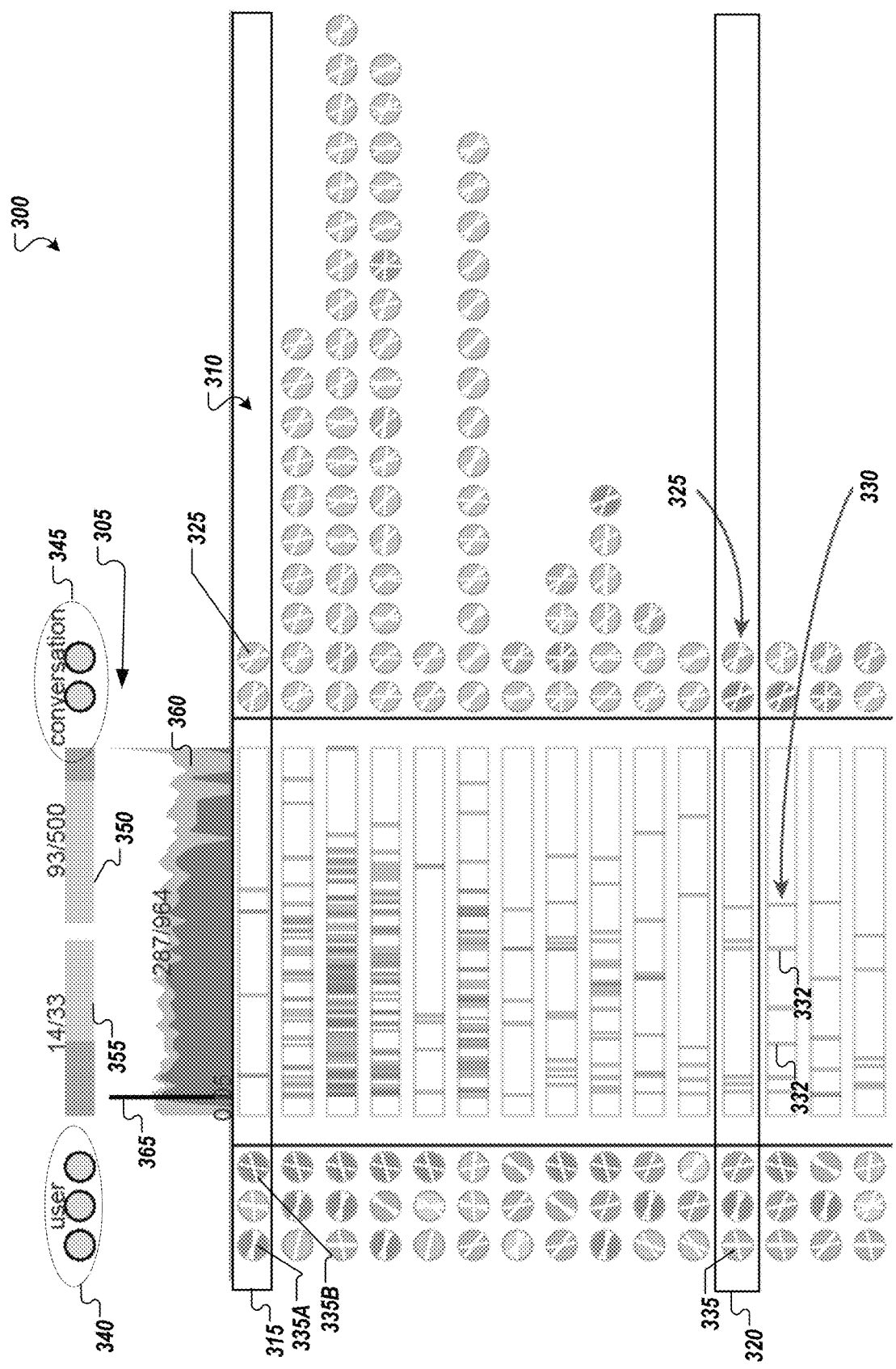
FIGS. 3A-3C illustrate initial visualizations of the output of a biclustering algorithm according to example implementations of the present application.

FIG. 3A illustrates an initial visualization 300 of the output of a biclustering algorithm according to an example implementation. In FIG. 3A, the biclustering algorithm has been applied to employee-conversation relationships data extracted from a corporate messaging system. The top part 305 of the visualization 300 illustrates an overview of the data and the bottom part 310 of the visualization represents each bicluster as a row (e.g. 315, 320, etc.).

Basic Bicluster Visualization:

In the bottom part 310, each row (e.g. 315, 320, etc.) represents a bicluster, in which the two types of entities (conversations 325 and users 335) are shown as gray circles (with a pattern provided to identify specific entity), and their relationships are shown as small semi-transparent lines 332 in a rectangle 330. The position of each line 332 within the rectangle 330 corresponds to its relationship weight, (e.g., from 0 to 1, from left to right). Thus, the rectangle 330 and lines 332 indicates a distribution of the relationship weights associated with each bicluster (e.g., row 315, 320). For example, row 320 in FIG. 3A represents a 3×2 bicluster, and some of its six relationships have similar weights thus overlapping with each other. Further, the color gradient of each entity circle (325, 335) may correspond to a number of biclusters that the entity belongs to (i.e., bicluster membership). For example, the darker the color corresponds to more biclusters the entity is a member of. With respect to example row 320, the first entity 335A and the third entity 335B under "users" have darker colors, indicating that these entities are shared by many other biclusters (e.g., rows). This aspect may allow an analyst to choose which entities to explore further.

Overview Visualization:

The top part 305 of the visualization 300 provides an overview of the biclustering results with respect to the original input to the biclustering algorithm. In the top part, a set of circles (340, 345) may be provided for each entity type (340 for users and 345 for conversations) to indicate the minimum size requirement for the biclustering. In some example implementations, the minimum size requirement may be a parameter of the bicluster generation operations at 215 and may be set during the parameter adjustment at 225 of FIG. 2. For example, in FIG. 3A, the analyst wants to find biclusters whose sizes are at least 3×2. The two bars (350, 355) in the middle of the top part 305 indicate the percentage of the total number of entities in the data that have been included in the biclustering output. On each bar 350, 355 the darker portion represents the percentage of entities included. Below the bars 350, 355, a chart 360 illustrates the weighted distributions of all the relationships in data (lighter color) and all the relationships included in the biclusters (darker color). This chart 360 shares the same axis with the rectangles 330 in the biclusters below, (e.g., 0 to 1 from left to right). In addition, a black line 365 indicates a threshold for the weighting values. For example, weights below this line 365 may be ignored. The value of the black line 365 may be a parameter of the biclustering algorithms used during the bicluster generation at 215 and may be set during the parameter adjustment at 225 of FIG. 2 in some example implementations.

Figure 4:
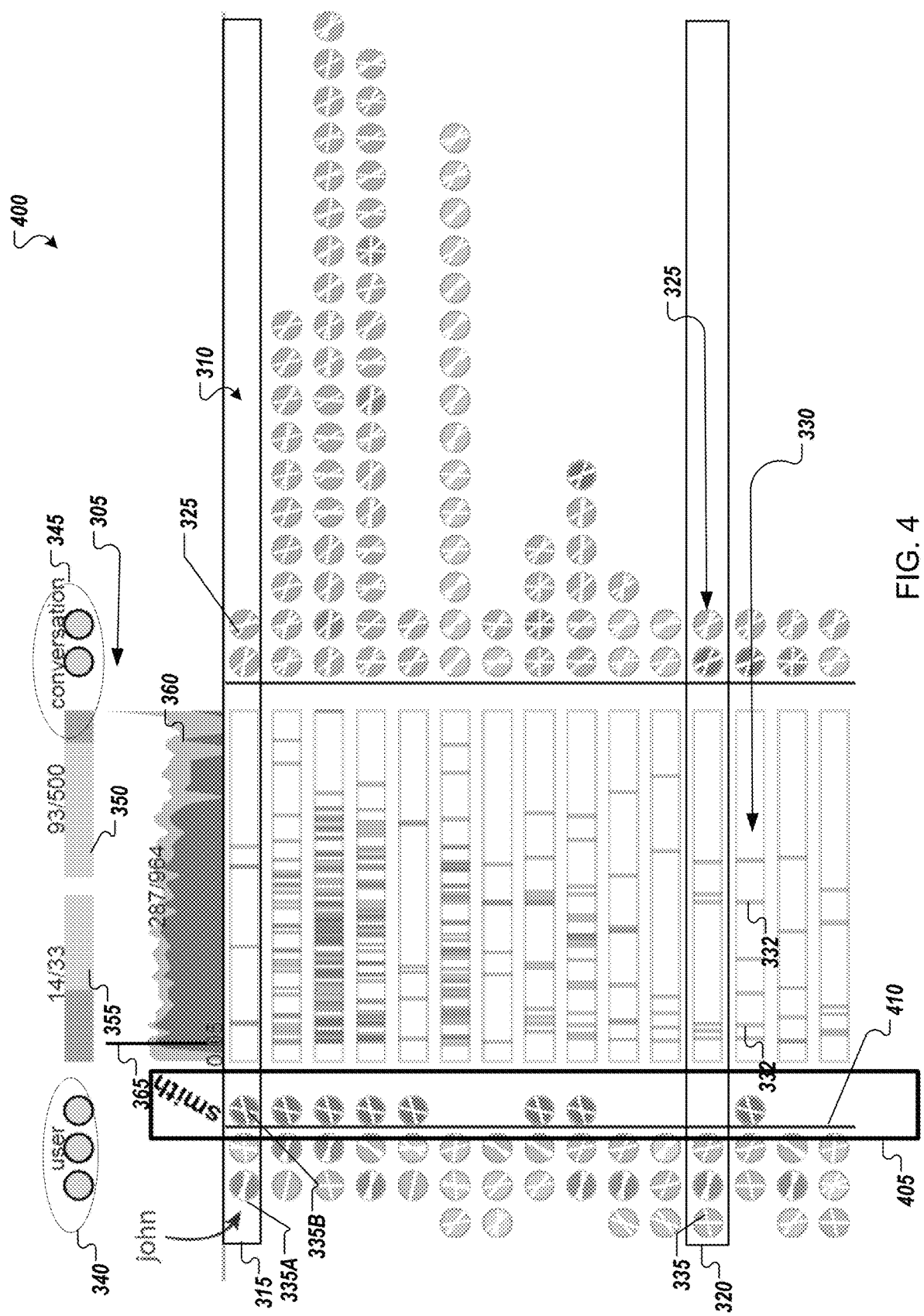
FIGS. 4 and 5 illustrate updated visualizations generated based on manipulation functions to example implementations of the present application.
Figure 5:
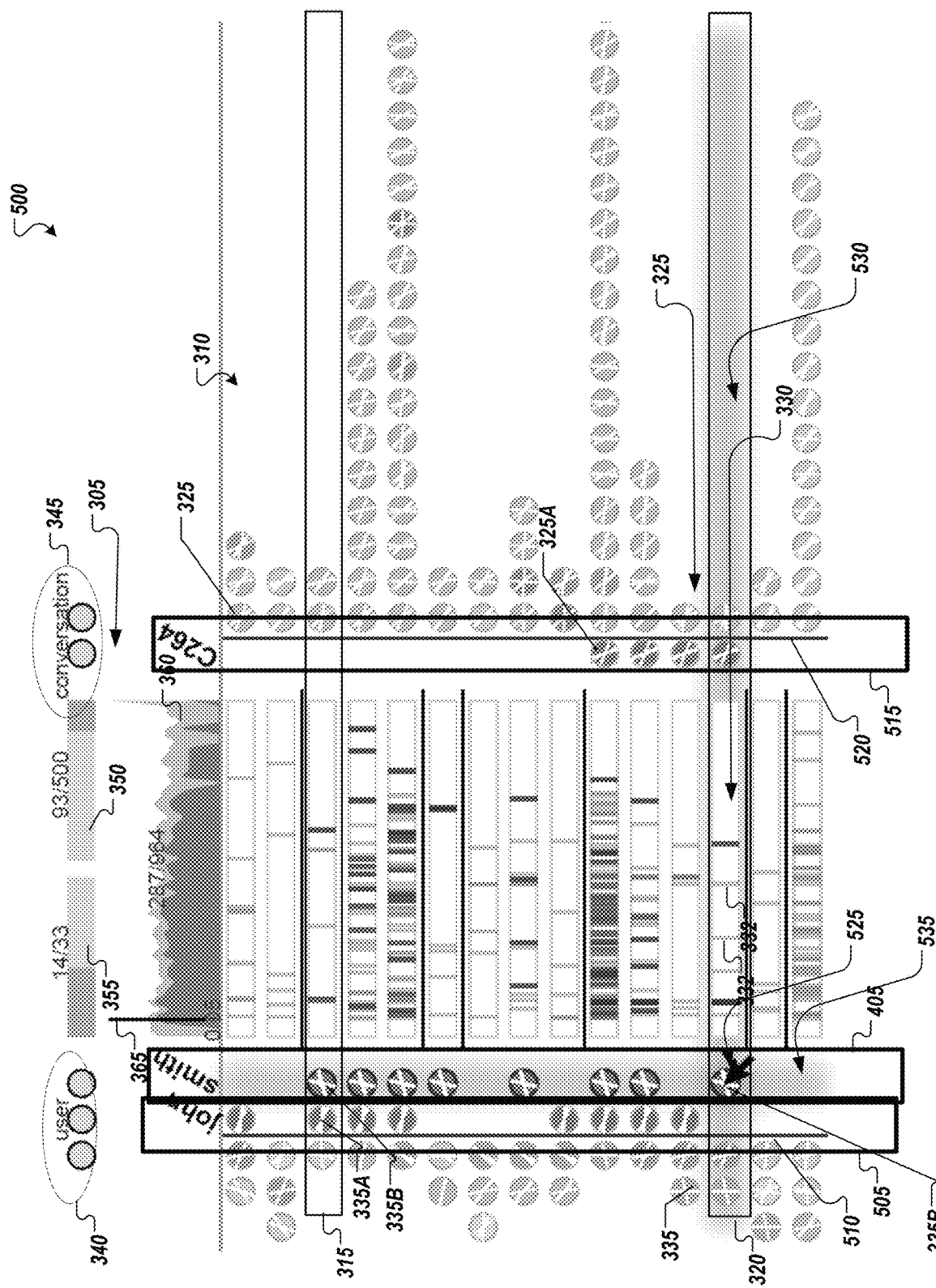

Once visualization 300 has been provided, the view manipulation at 235 by the visualization system 200 may provide a range of interactions or manipulation functions for users to manipulate the visualization 300. In some example implementations, the below discussed view manipulation functions may be accessible by either the toolbar controls of a user interface such as the user interface illustrated below in FIG. 10 and by directly manipulating the visualization. FIGS. 4 and 5 illustrate updated visualizations 400, 500 generated based on manipulation functions selected by a user.

Pinning:

When a user or analyst decides to further examine a particular entity and its memberships in the biclusters, the user can select (such as by double clicking) an entity (335B) to bring it out (pinning), forming an individual column 405 that better displays the entity's (335B) memberships to all the biclusters (e.g., rows 315, 320, etc.). For example, in FIG. 4, "Smith", the darker gray circle (entity 335B) is pinned by the analyst.

After pinning, the entity 335B takes a separate column 405 separated by the border line 410, and the analyst can clearly see which biclusters (e.g., rows 315, 320, etc.) include this entity 335B. Further, all the biclusters consisting of the pinned entity (e.g., rows 315, 320, etc.) may be deemed to be of interest by the analyst. Thus, all the entities belonging to these biclusters may be colored differently (e.g., darkened) as opposed to the rest of entities that may be grayed. Similarly, the color density may also map to the membership count of that entity in all the deemed-interesting biclusters. This visual encoding may help an analyst further identify what is the next most-shared entity in the biclusters related to the pinned entity 335B. For example, in FIG. 4A, the entity 335A (aka "john"), in the user domain of the first bicluster is in darker tone, indicating that it appears most frequently in conversations where "Smith" (entity 335B) participates in. An analyst can then pin this entity and the visual coding may update accordingly based on the new set of deemed-interesting biclusters (i.e., biclusters containing both "Smith" and "John") as discussed below with respect to FIG. 5. Similarly, an analyst can explore the other domain on the right (Entities 325 "conversation") by selecting entities of interests. Note that other color coding schemes for entities can be applied while maintaining the same interactivity.

Figure 3B:
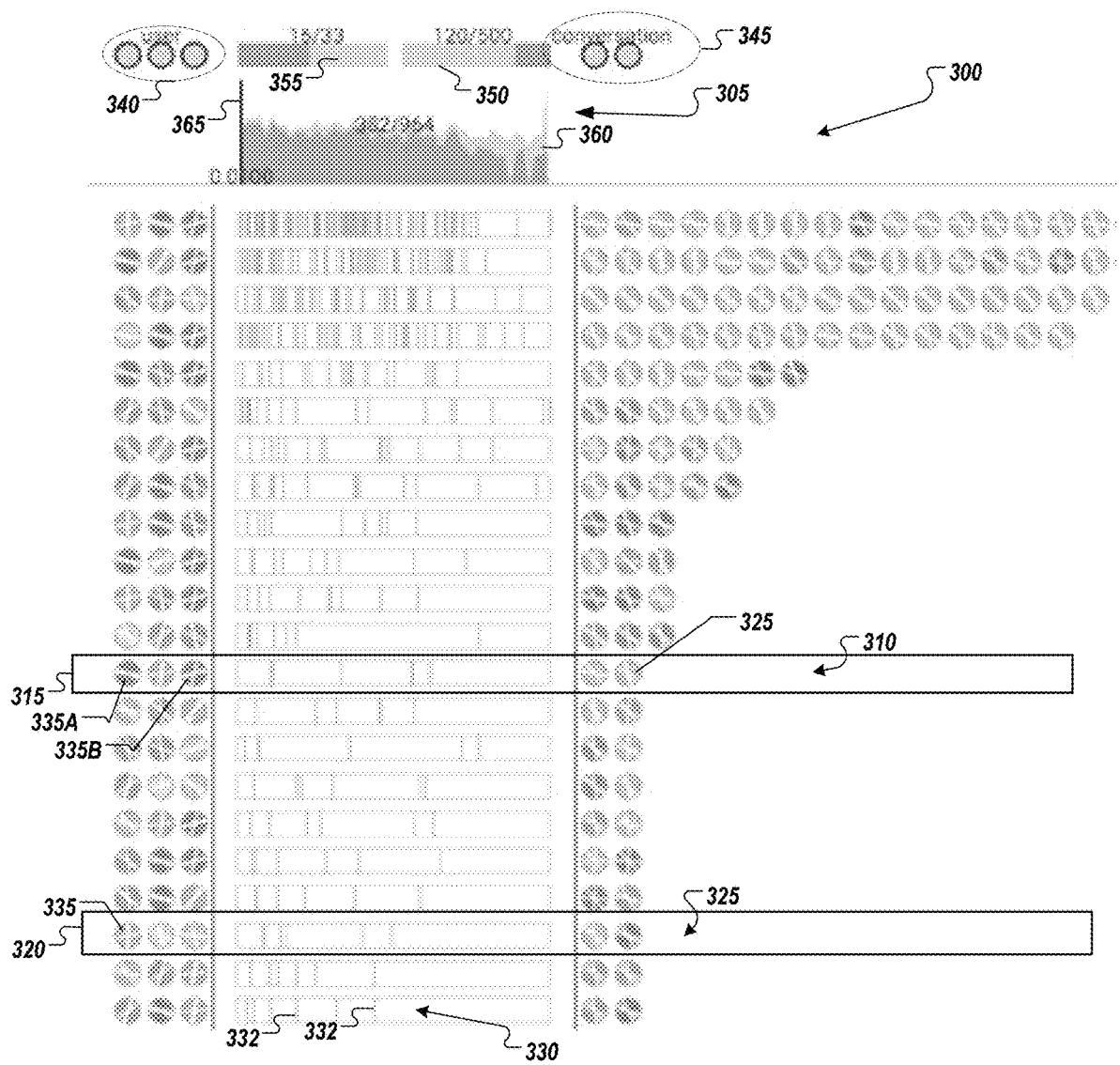
Figure 3C:
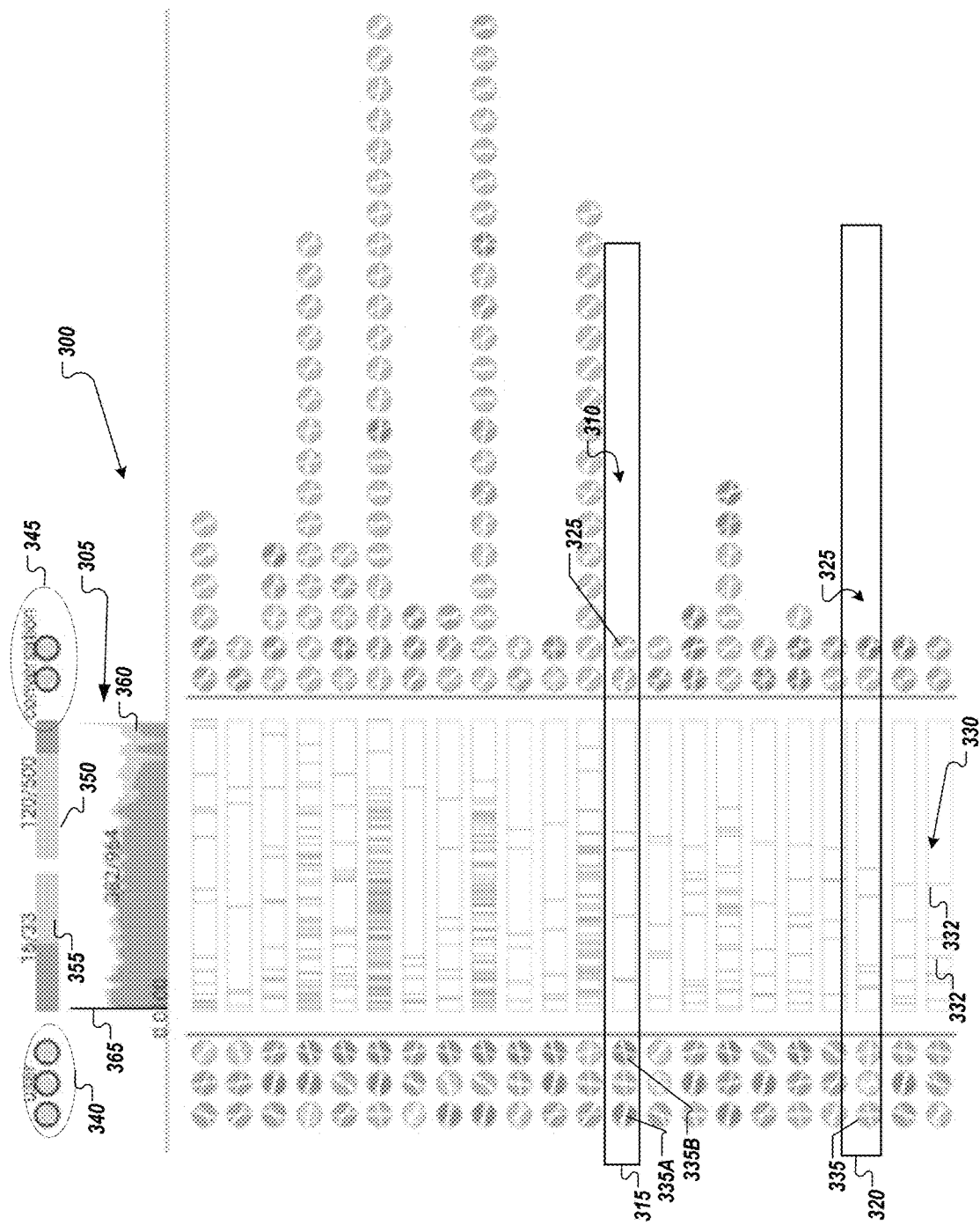

Ordering:

In some example implementations, the visualization may allow the biclusters to be ordered by the membership of a particular pinned entity. For example in some example implementations, clicking the entity label "Smith" (illustrated in column 405) may push all the associated biclusters to the top, and an animation of the visualization may be played to ease the transition of bicluster orders. Further, in some example implementations; clicking the label again may cancel the effect. In addition, biclusters can be sorted by many other attributes, such as size, average relationship weight, relationship weight variance, or any other variable that may be apparent to a person of ordinary skill in the art. FIGS. 3B and 3C illustrate initial visualizations sorted on different attributes. For example, FIG. 3B illustrates the initial visualization sorted based on the size of the biclusters and FIG. 3C illustrates the initial visualization sorted based on weight variance associated with the relations of each bicluster.

Visual Linking:

In FIG. 5, an updated visualization 500 is provided. In the updated visualization 500, the entities 335A ("John") and 325A (conversation "C264") have additionally been selected and pined. As illustrated, selected entities have been shifted toward the displayed boxes 330 in columns 505 and 515 and have been separated from the remaining entities by dividing lines 510, 520. Using a pointer 525 or other control element, an analyst can hover over a specific entity (e.g., the entity 335B ("Smith") shared between Column 405 and row 320) or relationship to view its cluster memberships on the fly. This allows the analyst to quickly learn about how the item is related to other entities and relationships in the biclusters. For example, in FIG. 5, the entity 335B ("Smith") shared between Column 405 and row 320 is hovered over, and two ribbons 530, 535 highlight the row 320 and column 405, respectively, to ease the exploration. At the same time, all the visual objects associated with the hovered over entity are emphasized in the visualization: circles representing the same entity in other biclusters are shown in darkened outlines and relationships connected with this entity in all the clusters may be highlighted.

Figure 6B:
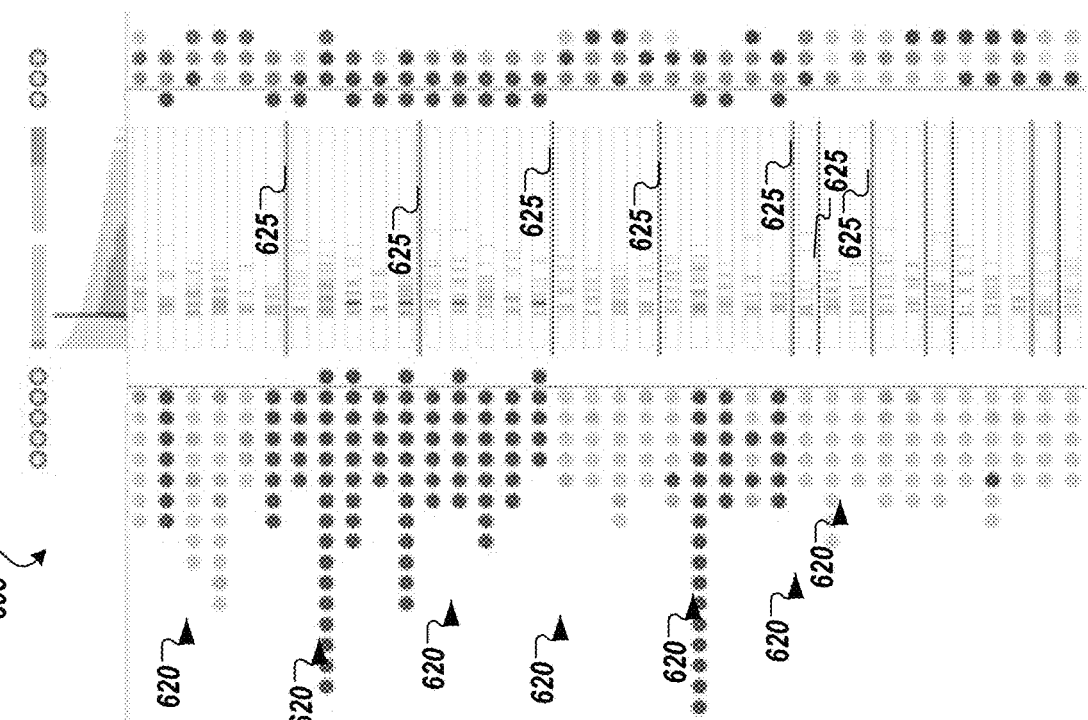
FIGS. 6A and 6B illustrate additional visualizations that may be generated using view manipulation options to example implementations of the present application.
Figure 6A:
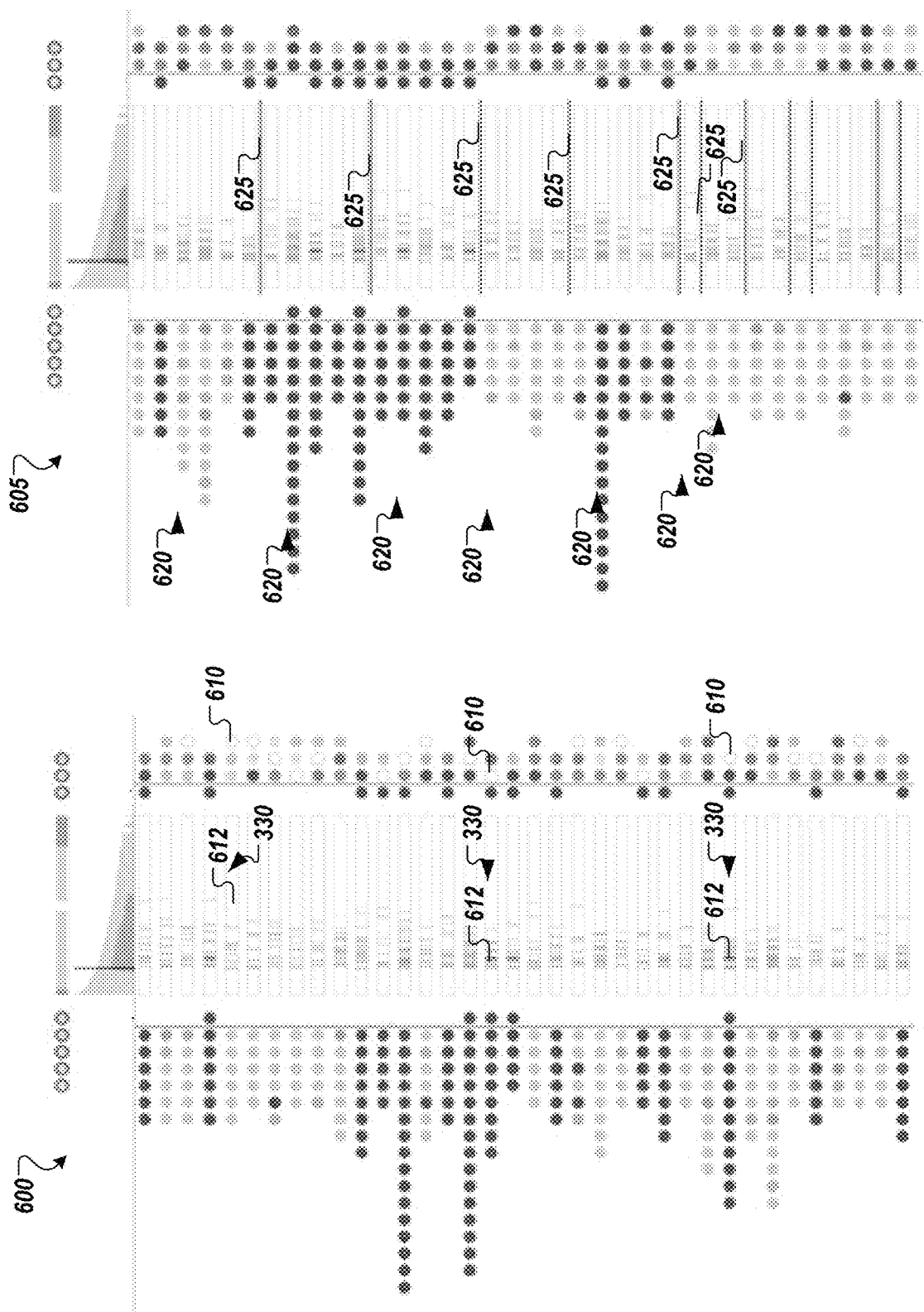

FIGS. 6A and 6B illustrate additional visualizations 600, 605 that may be generated using view manipulation options provided during view manipulation at 235.

Filtering:

FIG. 6A illustrates a visualization 600 to which filtering has been applied. For example, the analyst can choose to filter out certain entities or relationships (e.g., Entities 610 to reduce the visual complexity, without losing the context of data exploration. As illustrated, filtered entities are shown as hollow circles and their connected relationships 612 are shown in semi-transparent gray on the relation bars 330. The analyst can dynamically change the filters to focus on other objects in the visualization.

Grouping:

FIG. 6B illustrates a visualization 605 to which similarity grouping algorithms have been applied. In some cases, it might be difficult for the analyst to choose particular biclusters of interests to explore when the number of biclusters is large increases. To address this, the visualization system 200 may further support grouping of biclusters based on a similarity metric. For example, in some example implementations the visualization system may measure how close two biclusters using a variety of metrics including: the similarities of entities of the first domain, the similarities of the entities of the second domain, and the similarity of the relationships between the entities of first and second domains. Entity similarity for each domain may be determined by calculating the Jaccard distance, and relationship similarity between the entities may be based on the calculated weighted Jaccard distance. FIG. 6B illustrates the biclusters groups 620 with bicluster groups 620 being separated with black lines 625. The analyst can further order the groups 620 based on the group's average biclusters size, relationship weight, etc. Also, biclusters within each group 620 can be ordered separately with these criteria.

Figure 7:
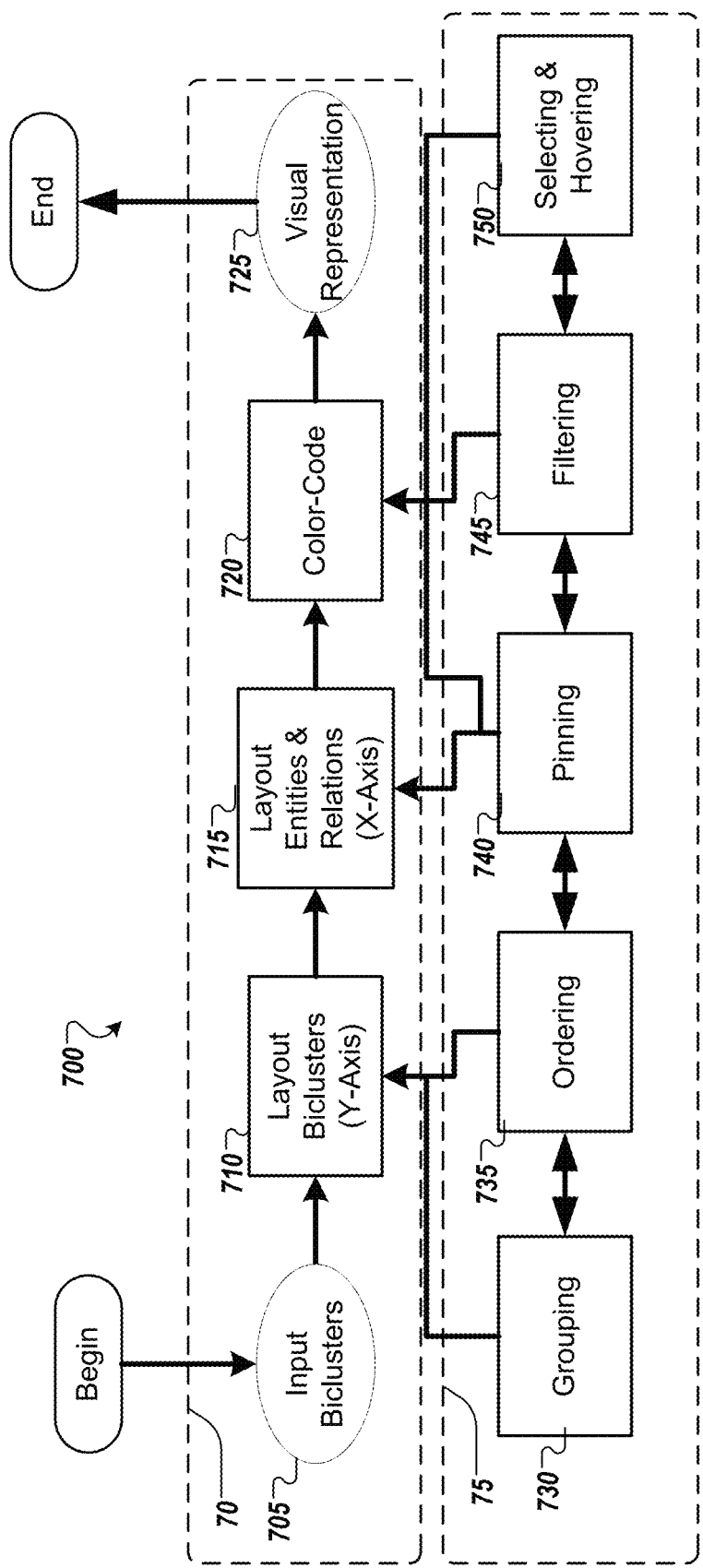
FIG. 7 illustrates a flowchart of a process for manipulating visualizations according to example implementations of the present application.

FIG. 7 provides a flowchart of a process 700 for manipulating the visualization to perform the various operations discussed above. In some example implementations, the process 700 may incorporate each of the interactions or manipulations discussed above and illustrate how the manipulations affect each other to illustrate. In some example implementations, one part (upper part 70 of FIG. 7) of the process 700 may be performed during the visualization generation 230 and another part (lower part 75 of FIG. 7) may be performed during the view manipulation 235 interaction with the visualization generation 230 to adjust portions of upper part 70 of the process 700. As illustrated, the process 700 begins with the biclusters detected using the biclustering algorithms 715 being input at 705. After the biclusters have been input, the biclusters are arranged into rows as was illustrated in FIGS. 3-5, 6A and 6B along the Y-axis of the visualizations at 710. The specific process of initially laying out the biclusters along the Y-axis may be performed based on a default configuration that of the visualization system 200. For example, the biclusters may be arranged in alphabetical order, numerical order, and size order based on the number of entities in each bicluster. As discussed below, the layout of the biclusters may be affected by grouping operations 730 and ordering operations 735 performed by a user.

Once the biclusters have been arranged along the Y-axis, entities and relationship information associated with each bicluster may be displayed laterally, e.g. along the X-axis of the visualization at 715. The specific process of initially laying out the relationships of the biclusters along the X-axis may be performed based on a default configuration that of the visualization system 200. For example, the entities of each biclusters may be arranged in alphabetical order, numerical order, and size order based on the number entities in each bicluster. As discussed below, the layout of the entities and relationships biclusters may be affected by pinning operations 740 performed by a user.

After the entities and relationships of each bicluster have been laid out, the entities and relationship information may be colored, shaded, or otherwise visually identified to correspond with detected relationships at 720. Example implementations of the coloring, shading etc. may be performed based on pinning operations 740, filtering operations 745 and selecting/hovering operations 750.

After the visualization has been color coded in 720, the visual representation 725 may be output to a user and the process 700 may end until a manipulation request is received. Once the manipulation request has been received, the processing of the lower part of FIG. 7 may be performed during the view manipulation at 235. As illustrated, each operation of the view manipulation at 235 may affect different aspects of the upper part 70 of the process. For example, the "grouping" operations 730 or the "ordering" operations 735 may affect the bicluster layout 710 stage of the upper part 70 of the process 700. Similarly, the "filtering" operations 745 and the "selecting and hovering" operations 750 may affect the color-coding 720 stage of the upper part 70 of the process 700. Further, the "pinning" operation 740 may affect both entity and relationship layout stage 715 and the color-coding stage of the upper part 70 of the process 700.

FIG. 7 also illustrates the interplaying relationships between different manipulations in the lower part 75 of the process. For example, the "grouping" operation 735 may affect or trigger an "ordering" operation 735 when the analyst wants to sort biclusters within a group or sort group globally. Similarly, a "pinning" operation 740 may affect or trigger "ordering operations" 735 if the analyst chooses a pinned entity as the anchor, and may also affect filtering operations 745. Further "ordering" operations 735 may affect both "grouping" operations 730 and "pinning" operations 740. Additionally, "filtering" operations 745 may affect both "pinning" operations 740 and "selecting and hovering" operations 750.

Figure 8A:
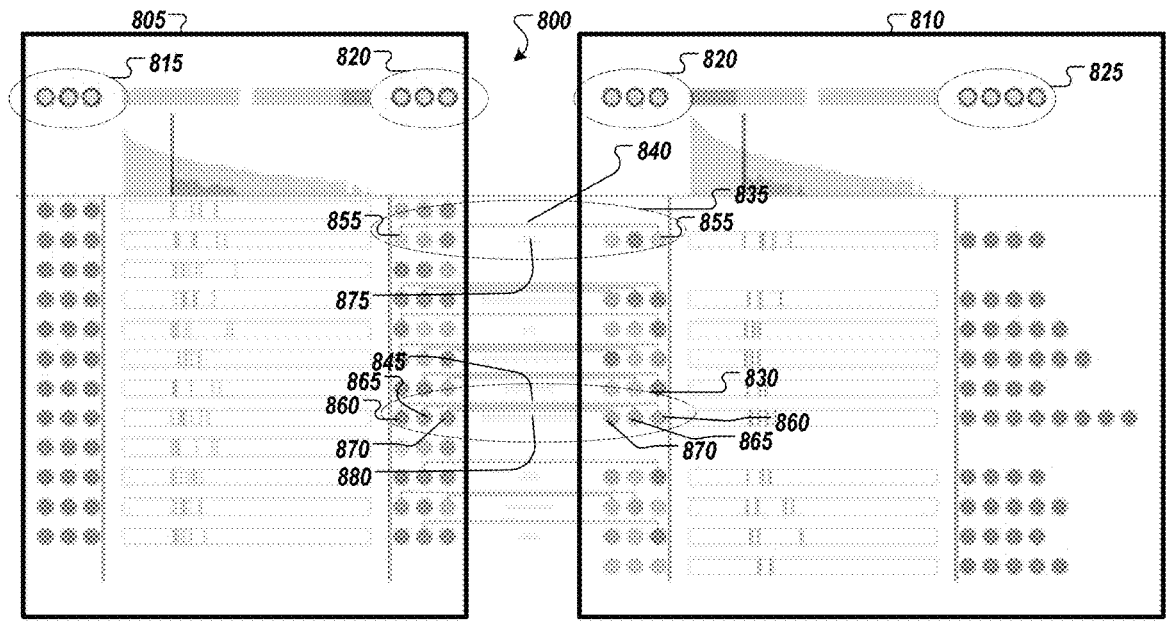
FIGS. 8A and 8B illustrate example implementations of bicluster chain visualizations according to example implementations of the present application.
Figure 8B:
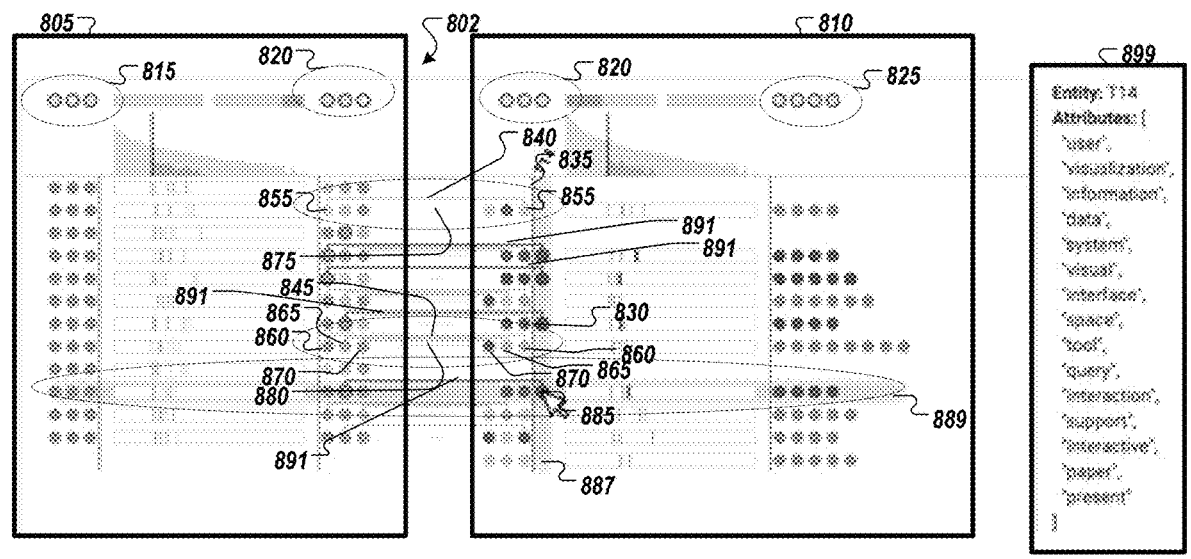

Visualization and Computation of Bicluster Chains:

In many real-world scenarios, an analyst may need to explore coordinated relationships between more than two different types of entities and perform biclustering on multiple relational datasets. For example, based on a first biclustering analysis, the employee-conversation relationships may tell us organic workgroups and conversations that are frequently shared among these workgroups. Further, a second, connected biclustering analysis based on the conversation-topic relationships may further tell us the topics that are often talked about within the work groups. Combining the results of these separate bicluster analysis in a bicluster chain may be able to reveal deeper insights in data. FIGS. 8A and 8B illustrate example implementations of bicluster chain visualizations 800, 802 used in this combined analysis.

Bicluster Chain Visualization:

As illustrated in FIGS. 8A and 8B, the visualization system may support the exploration of biclusters in multi-dimensional scenarios by matching entity sets of the same type generated by different biclustering processes. FIG. 8A illustrates a bicluster chain visualization 800 linking two bicluster visualizations 805, 810, each bicluster visualization being similar to the bicluster visualizations discussed above with respect to FIGS. 3-6. As illustrated, the first bicluster visualization 805 may be a visualization illustrating biclusters connecting document entities 815 with topic entities 820 associated with the documents. Further, the second bicluster visualization 810 may be a visualization illustrating biclusters connecting topic entities 820 with author entities 825 associated with the documents. Thus, the bicluster chain visualization 800 visualizes the results of document-topic biclustering 805 and topic-author biclustering 810 relationships computed based topic modeling from a publication corpus. In this example implementation, the common entity type (e.g., "topic" 820) topic is used to match the bicluster from both sides (805, 810). For each, matched bicluster pair (e.g., a bicluster chain 830, 835) in a row, the same topic entities may be connected with a horizontal line 840, 845. As illustrated, the horizontal line 840 may be thinner if only one entity 855 of the common entity type (e.g., "topic" 820) is shared between the first bicluster visualization 805 and the second bicluster visualization 810. Further, the horizontal line 845 may be thicker if more than one entity (e.g., 860, 865,870) of the common entity type (e.g., "topic" 820) is shared between the first bicluster visualization 805 and the second bicluster visualization 810.

Additionally, in some example implementations, a horizontal bar 875, 880 may be provided between the first bicluster visualization 805 and the second bicluster visualization 810 to represent the matching score between the two biclusters forming each bicluster chain 830, 835. For example, the bar 875, 880 may have a length corresponding to a matching score that is calculated based on the Jaccard distance between the bicluster in the first bicluster visualization 805 and the bicluster in the second bicluster visualization. In FIG. 8A, the bar 875 associated with bicluster chain 835 is shorter than the bar 880 associated with bicluster chain 830, illustrating a lower matching score for bicluster 835 then the matchings score for bicluster chain 830. Thus, an analyst may determine that the bicluster chain 830 represents a stronger correlation.

FIG. 8B illustrates an updated bicluster chain visualization 802 linking the two bicluster visualizations 805, 810 discussed above. As illustrated in FIG. 8B, an analyst may use a user input device to hover over an entity 885 to trigger a highlighting effect. This may trigger all instances of that entity 885 to be pinned to a separate, highlighted column 887. Additionally, the specific bicluster chain 889 in which the selected entity 885 is being selected may also be highlighted. Additionally, the lines 891 connecting the biclusters in the first bicluster visualization 805 to biclusters in the second bicluster visualization may be highlighted or offset in other bicluster chains containing the same linking entity 885. Using these processes, an analyst may be able to order the bicluster chains by quantities (e.g., size, average relationship length, etc.) of the first or the second biclustering result similar to the manipulations of the single bicluster group discussed above with respect to FIGS. 3-6 above. Additionally, in some example implementations the bicluster chain visualization 802 may also provide an analyst with keywords or attributes that are associated with the selected entity 899 in the corpus of data.

Figure 9:
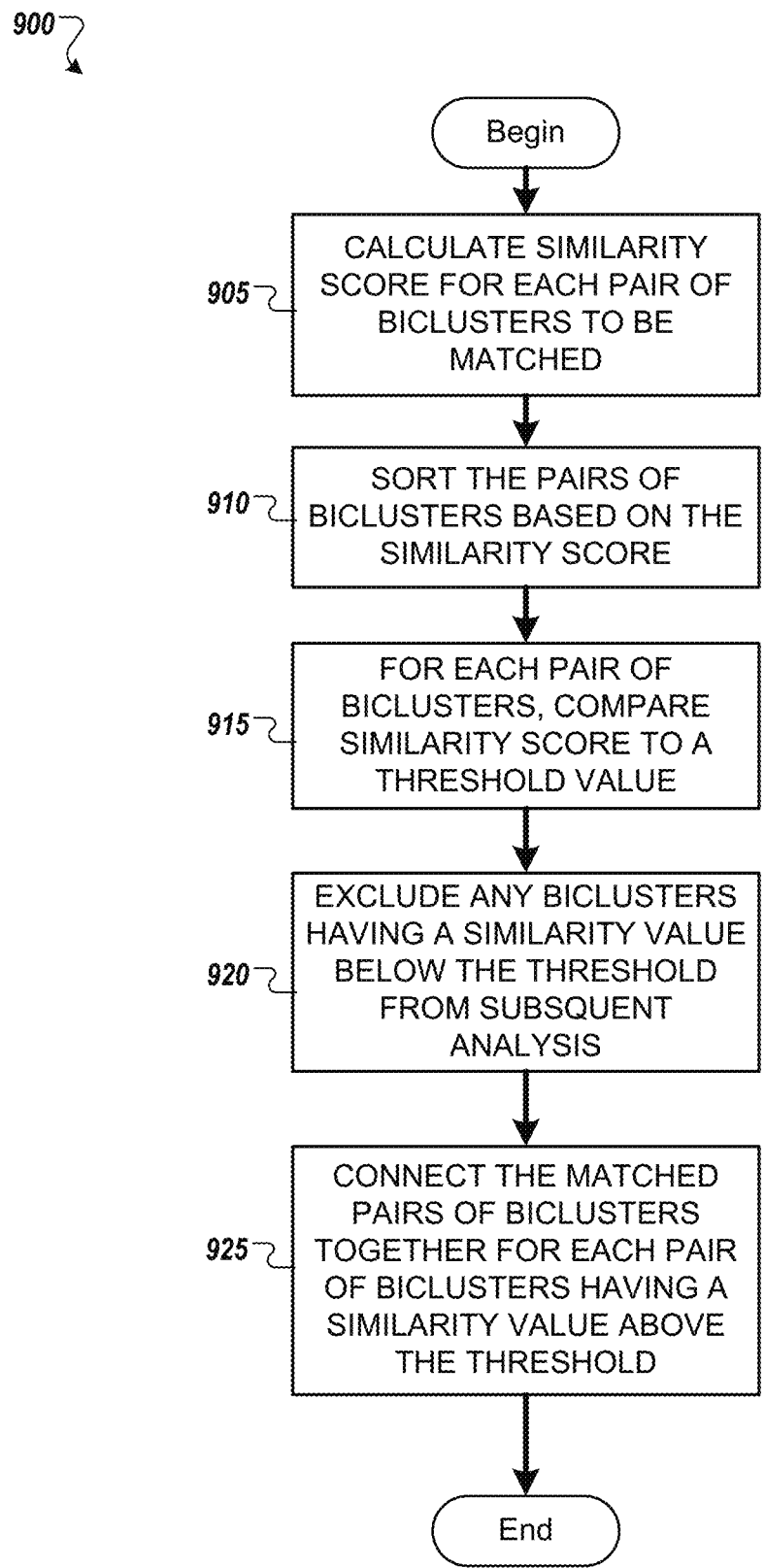
FIG. 9 illustrates an example process for calculating bicluster chains according to example implementations of the present application.

Bicluster Chain Computation:

FIG. 9 illustrates an example process for calculating bicluster chains according to an example implementation. The calculation of bicluster chains based groups of biclusters generated from different biclustering processes follow the process 900 illustrated in FIG. 9. In process 900, consecutive groups of Biclusters are matched together using an algorithm such as the algorithm illustrated in FIG. 13A (Algorithm 1). As illustrated, a similarity score is calculated for each pair of biclusters that is to be matched together in the chain at 905. In some example implementations, the similarity score may be calculated by calculating the Jaccard distance, or any other similarity calculation that may be apparent to a person of ordinary skill in the art.

After the similarity score is calculated for each pair of biclusters, the pairs of biclusters are sorted by similarity score in descending order at 910. Then for each bicluster pair, the similarity score is compared to a threshold value at 915. In some example implementations, the threshold value may be set or adjusted by the analyst to increase or decrease the number of bicluster chains generated. Any bicluster pairs having a similarity score below the threshold value may be classified as unmatched and may be removed or excluded from the analysis for display at 920. Unmatched biclusters may be displayed as an empty space in either side of the row in the visualization 800, 802.

Once all bicluster pairs having a similarity value below the threshold value have been removed or excluded, the remaining bicluster pairs are connected together using the linking entity (or entities if multiple entities are shared in any given bicluster pair) to create a visualization, such as visualizations 800, 802 illustrated in FIGS. 8A and 8B, at 925. In some example implementations, the bicluster pairs may be chained together using an algorithm such as the algorithm illustrated in FIG. 13B (Algorithm 2).

Dynamic Parameter Adjustment:

In some example implementations, the analyst may want to explore biclustering results by adjusting different parameters used to generate the biclustering engine 210. For example, the analyst may want to dynamically adjust the minimum weight threshold applied to different relationships or the minimum size of biclusters to be generated. Thus, in some example implementations, the visualization system 200 provides parameter adjustment at 225 that allows for dynamically adjusting these parameters, performing biclustering on the backend by the biclustering engine 210 and the bicluster matching 220, and updating the frontend visualization produced by visualization generation 230, in real time.

Figure 10:
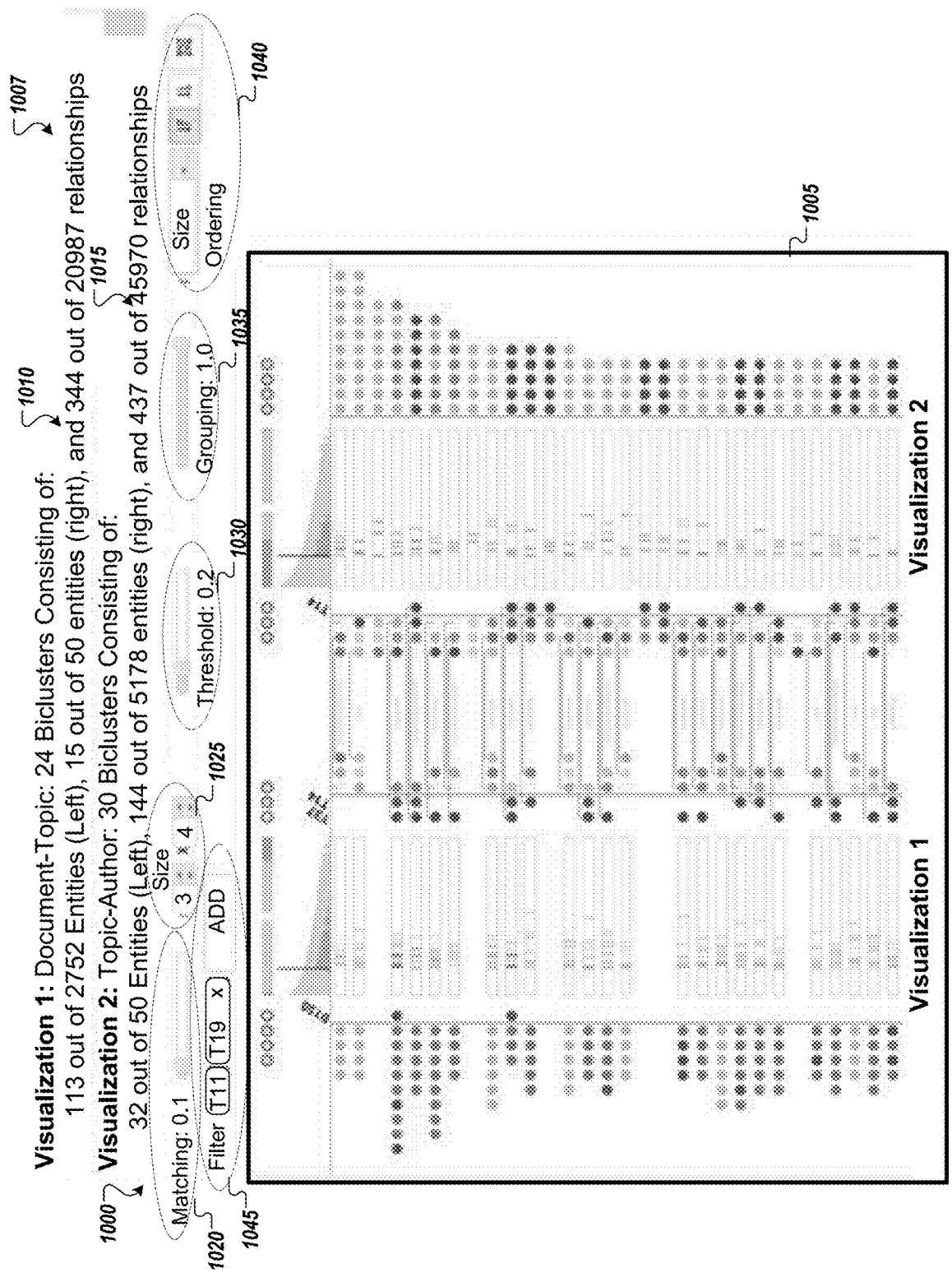
FIG. 10 illustrates a User Interface ("UI") that may control parameter adjustment of the visualization system according to example implementations of the present application.

FIG. 10 illustrates a User Interface ("UI") 1000 that may control the parameter adjustment at 225 of the visualization system 200. As illustrated, the UI 1000 includes a visualization area 1005 and a toolbar area 1007 above the visualization area 1005. The visualization area 1005 displays a visualization of chained biclusters such as the bicluster chain visualization 800 discussed above with respect to FIG. 8A. The toolbar area 1007 may provide a variety of controls to allow the analyst to configure the parameters governing the biclustering algorithms (e.g., biclustering algorithms of the biclustering engine 210 in FIG. 2) and the visualization area 1005 as well as perform certain interactions (such as ordering and filtering) with the visualization area 1005. The toolbar area 1007 may include informational fields 1010 and 1015 that provide a summary of the two bicluster visualizations displayed in the visualization area 1015. The toolbar area 1007 may also provide controls 1020, 1025, 1030 to control parameters of the biclustering algorithms. For example, control 1020 may allow adjustment of the matching parameter (e.g., "0.1") used to match entities to form biclusters. Further, control 1025 may allow the analyst to determine a minimum size of biclusters to be produced by the bicluster algorithms. Additionally, control 1030 may allow adjustment of the similarity threshold used to calculate bicluster chains.

The toolbar area 1007 may also provide control 1035 to select a number of groupings of biclusters to be displayed, and another control 1040 to select how biclusters are to be sorted in the visualization area 1005. The toolbar area may also provide a filter control 1045 to allow entities to be filtered out and visualization displayed in the visualization area.

Potential Applications:

Example implementations of the visualization system of the present application may be applied to a range of domains where an analyst may be interested in exploring coordinated relationships in data.

For example, in the context of analyzing communication patterns within an organization, FIGS. 3-5 were computed using data collected from an organization's internal messaging systems. In these example visualizations, "John" and "Smith" might be considered influential persons as they appear in most biclusters (e.g., employee-conversation groups). They are also consistent, close collaborators because they co-exist in many biclusters. Additionally, it may also provide interesting information to identify who else works with them by looking at the unpinned entities (on the left of the red line 510 in FIG. 5), which may indicate per-project differences (reflected by conversation groups on the right). Additionally, knowing which subgroups these people are from may be inferred if subgroup memberships are appropriate for a project. Similarly, conversation co-occurrence may be explored to discover closely related contents. Moreover, using the visualization and computation of bicluster chains as discussed with respect to FIGS. 8 and 9, more patterns of conversation contents may be found, for example, by integrating employee-conversation and conversation-topic biclusters.

Similarly, example implementations of the visualization system may be applied to analyze document-topic relationships. For example, topic co-occurrence in biclusters may indicate aspects that are often studied together, and may also be used to identify influential topics that appear in many biclusters. By chaining biclusters of document-topic and topic-author relationships, co-authorship patterns may also be identified. Similarly, for the above enterprise messaging analysis scenario, post-topic and topic-user relationships may also be explored.

Though exploration of author-conversation relationships and document-topic relationships have been discussed herein, example implementations are not limited to these types of relationships and may be applied to other types of relationships. For example, person-place co-occurrence relationships or any other relationship that might be apparent to a person of ordinary skill in the art may be explored.

Figure 11:
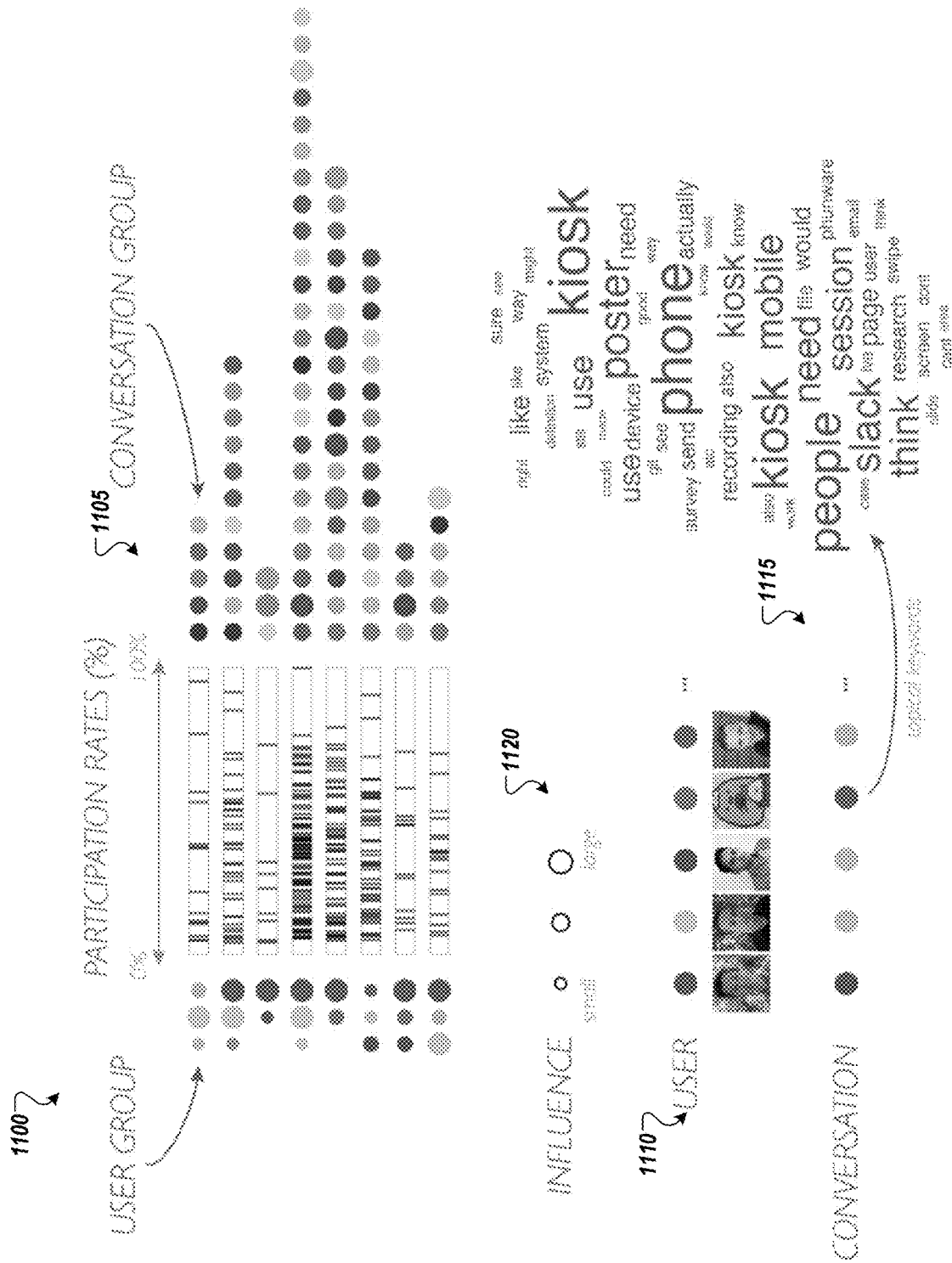
FIG. 11 illustrates another bicluster visualization 100 according to example implementations of the present application.

Moreover, example implementations of the present application may be applied for different visual encoding of the entities based on the application domains. FIG. 11 illustrates a bicluster visualization 1100 according to an alternative configuration. As illustrated, in the case of analyzing employee-conversation relationships, employee circles might be correlated to employee photos in section 1110 and conversations may be correlated to top keywords in section 1115, while the layouts and interaction remain the same in section 1105. Also, the size of the circle may be used to encode other quantities such as influence of people in section 1120. Thus, in some example implementations, the visualization system may provide high-level paradigm for exploration of coordinated relationships.

Example Computing Environment

Figure 12:
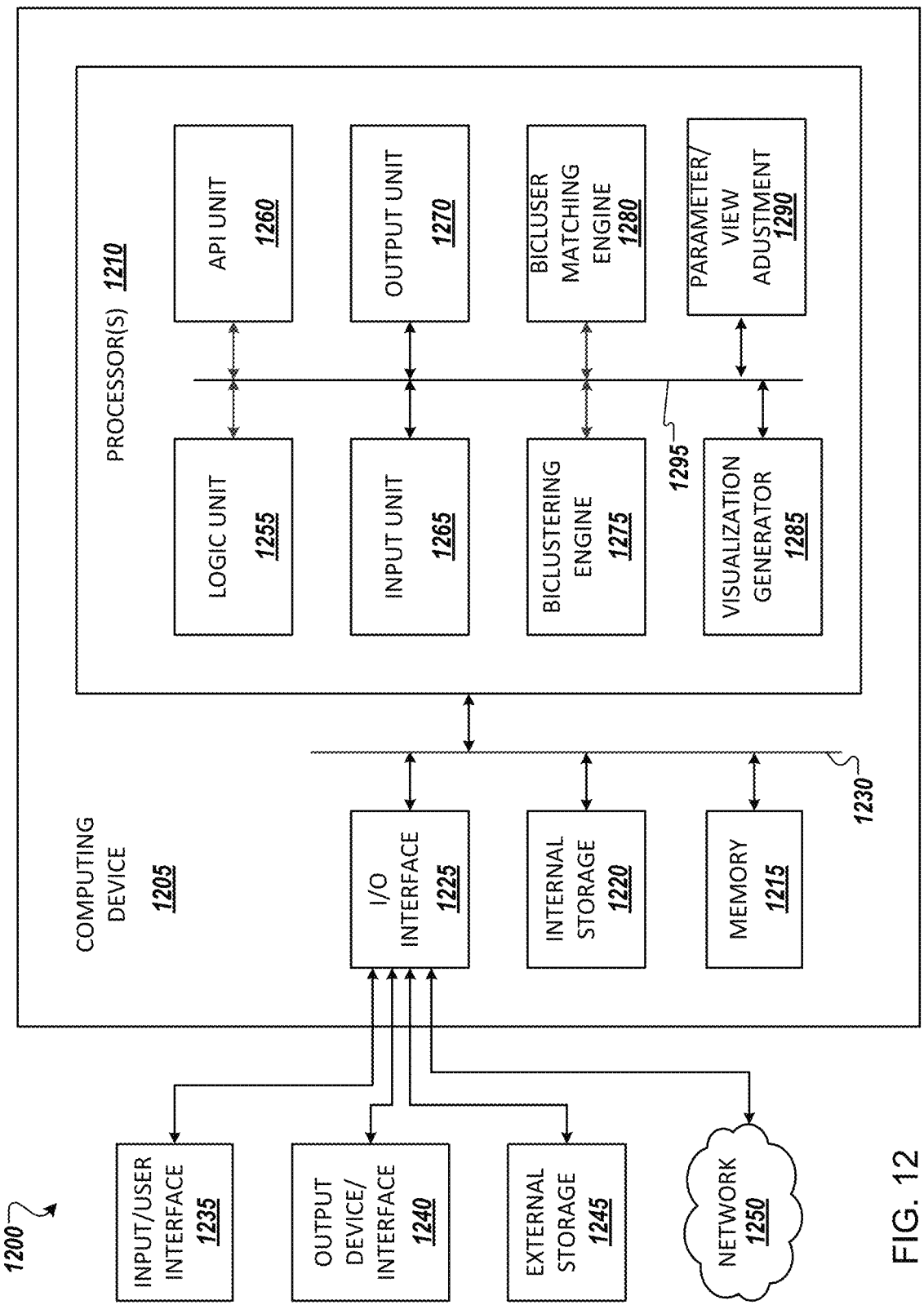
FIG. 12 illustrates an example computing environment with an example computer device suitable for use in some example implementations of the present application.

FIG. 12 illustrates an example computing environment 1200 with an example computer device 1205 suitable for use in some example implementations. Computing device 1205 in computing environment 1200 can include one or more processing units, cores, or processors 1210, memory 1215 (e.g., RAM, ROM, and/or the like), internal storage 1220

(e.g., magnetic, optical, solid state storage, and/or organic), and/or I/O interface 1225, any of which can be coupled on a communication mechanism or bus 1230 for communicating information or embedded in the computing device 1205.

Computing device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computing device 1205. In other example implementations, other computing devices may function as or provide the functions of input/user interface 1235 and output device/interface 1240 for a computing device 1205.

Examples of computing device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1205 can be communicatively coupled (e.g., via I/O interface 1225) to external storage 1245 and network 1250 for communicating with any number of networked components, devices, and systems, including one or more computing devices of the same or different configuration. Computing device 1205 or any connected computing device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computing device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1255, application programming interface (API) unit 1260, input unit 1265, output unit 1270, biclustering engine 1275, bicluster matching engine 1280, visualization generator 1285, parameter/view adjustment engine 1290, and inter-unit communication mechanism 1295 for the different units to communicate with each other, with the OS, and with other applications (not shown). For example, biclustering engine 1275, bicluster matching engine 1280, visualization generator 1285, and parameter/view adjustment engine 1290 may implement one or more processes shown in FIGS. 2, 7, and 9. The described units and elements can be varied in design, function, configuration, or implementation and are not limited to the descriptions provided.

In some example implementations, when information or an execution instruction is received by API unit 1260, it may be communicated to one or more other units (e.g., logic unit 1255, input unit 1265, biclustering engine 1275, bicluster matching engine 1280, visualization generator 1285, and parameter/view adjustment engine 1290). For example, the biclustering engine 1275 may receive relationship data via the input unit 1265, and provide the generated biclusters to the bicluster matching engine 1280. Once the bicluster matching engine 1280 has matched biclusters based on shared entities, the matched biclusters may be provided to the visualization generator 1285 to generate visualization. Further, the parameter/view adjustment engine 1230 may control the visualization generator 1285 and the biclustering engine 1275 to update and modify the visualization.

In some instances, the logic unit 1255 may be configured to control the information flow among the units and direct the services provided by API unit 1260, input unit 1265, output unit 1270, biclustering engine 1275, bicluster matching engine 1280, visualization generator 1285, and parameter/view adjustment engine 1290 in some example implementations described above. For example, the flow of one or more processes or implementations may be controlled by logic unit 1255 alone or in conjunction with API unit 1260.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of visualizing relationship data, the method comprising:

Receiving, from a database, stored relationship data comprising a first type of entities, a second type of entities, and data representative of relationships between an entity of the first type and an entity of the second type, wherein the data representative of relationships comprises data representing a plurality of relationships between a plurality of entities of the first type and a plurality of entities of the second type, and additional data representative of relationships between another plurality of entities of the first type and a plurality of entities of the third type;

generating, by a processor implemented biclustering engine, based on the data representative of relationships, a bicluster connecting the entity of the first type to the entity of the second type;

generating, based on the additional data representative of relationships, another bicluster connecting each of the another plurality of first type of entities to each of the plurality of third type of entities;

generating a bicluster chain connecting the bicluster to the generated other bicluster; and generating a visualization based on the bicluster generated, the other bicluster generated and the bicluster chain connecting the bicluster to the generated other bicluster, and controlling a display device to display and dynamically update the visualization in real time, wherein the visualization comprises:
- a first column representative of the first type of entities; and
- a second column representative of the second type of entities, wherein each row of the visualization corresponds to the generated bicluster;
- a third column representative of the third type of entities; and
- a visual element representative of the bicluster chain connecting entities of the third type to entities of the second type based on connections to entities of the first type;
- a weighted visual representation of a relationship between the entity of the first type and the entity of the second type comprising:
  - a first type of visual element extending in a first direction between the first column and the second column representing the bicluster connecting the first type of entities to the second type of entities; and
  - a plurality of visual elements of a second type arranged in the first direction, each element of the second type extending in a second direction perpendicular to the first direction,
  - wherein the plurality of visual elements of the second type are positioned within the first type of visual element, each of the plurality of visual elements of the second type being associated with one of the plurality of relationships between the plurality of entities of the first type and the plurality of entities of the second type, and
  - wherein the positioning of the each second type of visual element between the first column and the second column corresponds to a strength value associated with the relationship associated with the second type of visual element.

2. The method of claim 1,
wherein the generated bicluster connects each of the plurality of entities of the first type to each of the plurality of entities of the second type; and
wherein the generated visualization further comprises:
- the first column representative of the plurality of entities of the first type; and
- the second column representative of the plurality of entities of the second type,
- wherein the weighted visual representation is positioned between the first column and the second column.

3. The method of claim 2,
wherein the generating the visualization comprises additionally generating:
- a weighted visual representation of a relationship between the other plurality of the first type of entities and the plurality of the third type of entities; and
- a weighted visual representation of a relationship between the bicluster and the other bicluster.

4. The method of claim 3, wherein the generating the bicluster chain comprises:
calculating a similarity value between the plurality of first type of entities of the bicluster and other plurality of first type of entities of the other bicluster;
determining whether the calculated similarity value is greater than or equal to a threshold value; and
in response to a determination that the calculated similarity value is greater than or equal to the threshold value, connecting the bicluster with the other bicluster based on the plurality of first type entities and the other plurality of first type of entities.

5. The method of claim 3, further comprising:
generating, based on the additional data representative of relationships, a third bicluster connecting each of the third plurality of first type of entities to each of a third plurality of third type of entities;
wherein the generating the bicluster chain comprises:
calculating a first similarity value between the plurality of first type of entities of the bicluster and the other plurality of first type of entities of the other bicluster;
calculating a second similarity value between the third plurality of first type of entities of the bicluster and the third plurality of first type of entities of the third bicluster;
determining whether either the calculated first similarity value and the second similarity value is greater than or equal to a threshold value; and
in response to a determination that both the calculated first similarity value and the second similarity value is greater than or equal to the threshold value;
connecting the bicluster with the other bicluster based on the plurality of first type entities and the other plurality of first type of entities to form a first bicluster chain;
connecting the bicluster with the third bicluster based on the third plurality of first type entities and the third plurality of first type of entities to form a second bicluster chain;
ranking the first bicluster chain and the second bicluster chain based on the first similarity value and the second similarity value.

6. The method 4, wherein the threshold value is a user set threshold value.

7. A non-transitory computer readable medium having stored therein a program for making a computer execute a method of visualizing relationship data, the method comprising:
receiving, from a database, stored relationship data comprising a first type of entities, a second type of entities, and data representative of relationships between an entity of the first type and an entity of the second type, wherein the data representative of relationships comprises data representing a plurality of relationships between a plurality of entities of the first type and a plurality of entities of the second type, and additional data representative of relationships between another plurality of entities of the first type and a plurality of entities of the third type;

generating, by a processor implemented biclustering engine, based on the data representative of relationships, a bicluster connecting the entity of the first type to the entity of the second type;

generating, based on the additional data representative of relationships, another bicluster connecting each of the another plurality of first type of entities to each of the plurality of third type of entities;

generating a bicluster chain connecting the bicluster to the generated other bicluster; and generating a visualization based on the bicluster generated, the other bicluster generated and the bicluster chain connecting the bicluster to the generated other bicluster, and controlling a display device to display and dynamically update the visualization in real time, wherein the visualization comprises:
- a first column representative of the first type of entities; and
- a second column representative of the second type of entities, wherein each row of the visualization corresponds to the generated bicluster;
- a third column representative of the third type of entities; and
- a visual element representative of the bicluster chain connecting entities of the third type to entities of the second type based on connections to entities of the first type;
- a weighted visual representation of a relationship between the entity of the first type and the entity of the second type comprising:
  - a first type of visual element extending in a first direction between the first column and the second column representing the bicluster connecting the first type of entities to the second type of entities; and
  - a plurality of visual elements of a second type arranged in the first direction, each element of the second type extending in a second direction perpendicular to the first direction,
  - wherein the plurality of visual elements of the second type are positioned within the first type of visual element, each of the plurality of visual elements of the second type being associated with one of the plurality of relationships between the plurality of entities of the first type and the plurality of entities of the second type, and
  - wherein the positioning of the each second type of visual element between the first column and the second column corresponds to a strength value associated with the relationship associated with the second type of visual element.

8. The non-transitory computer readable medium of claim 7,
wherein the generated bicluster connects each of the plurality of entities of the first type to each of the plurality of entities of the second type; and
wherein the generated visualization further comprises:
- the first column representative of the plurality of entities of the first type; and
- the second column representative of the plurality of entities of the second type, wherein the weighted visual representation is positioned between the first column and the second column.

9. The non-transitory computer readable medium of claim 8,
wherein the generating the visualization comprises additionally generating:
- a weighted visual representation of a relationship between the other plurality of the first type of entities and the plurality of the third type of entities; and
- a weighted visual representation of a relationship between the bicluster and the other bicluster.

10. The non-transitory computer readable medium of claim 9, wherein the generating the bicluster chain comprises:
calculating a similarity value between the plurality of first type of entities of the bicluster and other plurality of first type of entities of the other bicluster;
determining whether the calculated similarity value is greater than or equal to a threshold value; and
in response to a determination that the calculated similarity value is greater than or equal to the threshold value, connecting the bicluster with the other bicluster based on the plurality of first type entities and the other plurality of first type of entities.

11. The non-transitory computer readable medium of claim 9, further comprising:
generating, based on the additional data representative of relationships, a third bicluster connecting each of the third plurality of first type of entities to each of a third plurality of third type of entities;
wherein the generating the bicluster chain comprises:
calculating a first similarity value between the plurality of first type of entities of the bicluster and the other plurality of first type of entities of the other bicluster;
calculating a second similarity value between the third plurality of first type of entities of the bicluster and the third plurality of first type of entities of the third bicluster;
determining whether either the calculated first similarity value and the second similarity value is greater than or equal to a threshold value; and
in response to a determination that both the calculated first similarity value and the second similarity value is greater than or equal to the threshold value;
connecting the bicluster with the other bicluster based on the plurality of first type entities and the other plurality of first type of entities to form a first bicluster chain;
connecting the bicluster with the third bicluster based on the third plurality of first type entities and the third plurality of first type of entities to form a second bicluster chain;
ranking the first bicluster chain and the second bicluster chain based on the first similarity value and the second similarity value.

12. A computer apparatus configured to visualize relationship data, the computer apparatus comprising:
a memory storing relationship data comprising a first type of entities, a second type of entities, and data representative of relationships between an entity of the first type and an entity of the second type, wherein the data representative of relationships comprises data representing a plurality of relationships between a plurality of entities of the first type and a plurality of entities of the second type, and additional data representative of relationships between another plurality of entities of the first type and a plurality of entities of the third type;
a processor implementing a biclustering engine and executing a process comprising:
generating, based on the data representative of relationships, a bicluster connecting the entity of the first type to the entity of the second type; and generating, based on the additional data representative of relationships, another bicluster connecting each of the another plurality of first type of entities to each of the plurality of third type of entities;

generating a bicluster chain connecting the bicluster to the generated other bicluster; and generating a visualization based on the bicluster generated, the other bicluster generated and the bicluster chain connecting the bicluster to the generated other bicluster, and controlling a display device to display and dynamically update the visualization in real time, wherein the visualization comprises:
- a first column representative of the first type of entities; and
- a second column representative of the second type of entities, wherein each row of the visualization corresponds to the generated bicluster;
- a third column representative of the third type of entities; and
- a visual element representative of the bicluster chain connecting entities of the third type to entities of the second type based on connections to entities of the first type:
  - a weighted visual representation of a relationship between the entity of the first type and the entity of the second type comprising:
    - a first type of visual element extending in a first direction between the first column and the second column representing the bicluster connecting the first type of entities to the second type of entities; and
    - a plurality of visual elements of a second type arranged in the first direction, each element of the second type extending in a second direction perpendicular to the first direction,
      wherein the plurality of visual elements of the second type are positioned within the first type of visual element, each of the plurality of visual elements of the second type being associated with one of the plurality of relationships between the plurality of entities of the first type and the plurality of entities of the second type, and
    wherein the positioning of the each second type of visual element between the first column and the second column corresponds to a strength value associated with the relationship associated with the second type of visual element.

13. The computer apparatus of claim 12;
wherein the generated bicluster connects each of the plurality of entities of the first type to each of the plurality of entities of the second type; and
wherein the generated visualization further comprises:
the first column representative of the plurality of entities of the first type; and
the second column representative of the plurality of entities of the second type,
wherein the weighted visual representation is positioned between the first column and the second column.

14. The computer apparatus of claim 13,
wherein the generating the visualization comprises additionally generating:
- a weighted visual representation of a relationship between the other plurality of the first type of entities and the plurality of the third type of entities; and
- a weighted visual representation of a relationship between the bicluster and the other bicluster.

15. The computer apparatus of claim 14, wherein the generating the bicluster chain comprises:
calculating a similarity value between the plurality of first type of entities of the bicluster and other plurality of first type of entities of the other bicluster;
determining whether the calculated similarity value is greater than or equal to a threshold value; and
in response to a determination that the calculated similarity value is greater than or equal to the threshold value, connecting the bicluster with the other bicluster based on the plurality of first type entities and the other plurality of first type of entities.

16. The computer apparatus of claim 14, wherein the process further comprises:
generating, based on the additional data representative of relationships, a third bicluster connecting each of the third plurality of first type of entities to each of a third plurality of third type of entities;
wherein the generating the bicluster chain comprises:
calculating a first similarity value between the plurality of first type of entities of the bicluster and the other plurality of first type of entities of the other bicluster;
calculating a second similarity value between the third plurality of first type of entities of the bicluster and the third plurality of first type of entities of the third bicluster;
determining whether either the calculated first similarity value and the second similarity value is greater than or equal to a threshold value; and
in response to a determination that both the calculated first similarity value and the second similarity value is greater than or equal to the threshold value;
connecting the bicluster with the other bicluster based on the plurality of first type entities and the other plurality of first type of entities to form a first bicluster chain;
connecting the bicluster with the third bicluster based on the third plurality of first type entities and the third plurality of first type of entities to form a second bicluster chain;
ranking the first bicluster chain and the second bicluster chain based on the first similarity value and the second similarity value.

* * * * *